(12) United States Patent
Kursun et al.

(10) Patent No.: US 9,923,855 B2
(45) Date of Patent: Mar. 20, 2018

(54) SYSTEMS AND METHODS FOR ELECTRONIC MESSAGE PRIORITIZATION

(71) Applicant: JP Morgan Chase Bank, N.A., New York, NY (US)

(72) Inventors: Eren Kursun, New York, NY (US); Gene Fernandez, Holmdel, NJ (US); Alex Berson, Dayton, NJ (US); Brian Goodman, Redding, CT (US)

(73) Assignee: JPMorgan Chase Bank, N.A., New York, NY (US)

( * ) Notice: Subject to any disclaimer, the term of this patent is extended or adjusted under 35 U.S.C. 154(b) by 432 days.

(21) Appl. No.: 14/094,565

(22) Filed: Dec. 2, 2013

(65) Prior Publication Data

US 2015/0039705 A1    Feb. 5, 2015

Related U.S. Application Data

(60) Provisional application No. 61/861,171, filed on Aug. 1, 2013, provisional application No. 61/888,909, filed on Oct. 9, 2013.

(51) Int. Cl.
*H04L 12/58* (2006.01)

(52) U.S. Cl.
CPC .................................. *H04L 51/26* (2013.01)

(58) Field of Classification Search
None
See application file for complete search history.

(56) References Cited

U.S. PATENT DOCUMENTS

| 5,072,294 A | 12/1991 | Engle |
| 5,229,764 A | 7/1993 | Matchett |
| 5,648,648 A | 7/1997 | Chou |
| 6,532,459 B1 | 3/2003 | Berson |

(Continued)

FOREIGN PATENT DOCUMENTS

| EP | 2560123 | 2/2013 |
| WO | WO 2008/055181 | 5/2008 |

(Continued)

OTHER PUBLICATIONS

Notification of Transmittal of The International Search Report and The Written Opinion of the International Searching Authority, or The Declaration, dated Nov. 24, 2014.

(Continued)

*Primary Examiner* — Scott B Christensen
(74) *Attorney, Agent, or Firm* — Hunton & Williams LLP

(57) ABSTRACT

Systems and methods for prioritizing electronic messages in an electronic message repository are disclosed. According to one embodiment, a method may include (1) at least one computer processor determining an amount of message review time for a user; (2) the at least one computer processor estimating a number of electronic messages that the user can review in the message review time; (3) the at least one computer processor determining a priority level for a plurality of electronic messages in the user's electronic message repository; (4) the at least one computer processor selecting electronic messages from the user's electronic message repository based on the estimated number of electronic messages that the user can review and the priority level for the electronic messages.

11 Claims, 14 Drawing Sheets

(56) References Cited

U.S. PATENT DOCUMENTS

| | | |
|---|---|---|
| 6,697,942 B1 | 2/2004 | L'Heureux et al. |
| 7,174,323 B1 | 2/2007 | Schultz et al. |
| 7,330,570 B2 | 2/2008 | Sogo |
| 7,360,239 B2 | 4/2008 | Mandalia et al. |
| 7,454,470 B1 | 11/2008 | Isaacs |
| 8,065,175 B1 | 11/2011 | Lewis |
| 8,191,126 B2 | 5/2012 | Raghavan |
| 8,606,611 B1 | 12/2013 | Fedorov |
| 8,724,910 B1 | 5/2014 | Pillai |
| 8,892,461 B2 | 11/2014 | Lau et al. |
| 9,280,715 B2 | 3/2016 | Stephanson |
| 2001/0036300 A1 | 11/2001 | Xia |
| 2002/0138742 A1 | 9/2002 | Hamid |
| 2002/0140542 A1 | 10/2002 | Prokoski |
| 2002/0174344 A1 | 11/2002 | Ting |
| 2002/0180586 A1 | 12/2002 | Kitson et al. |
| 2002/0198731 A1 | 12/2002 | Barnes |
| 2003/0031348 A1 | 2/2003 | Kuepper et al. |
| 2003/0046228 A1 | 3/2003 | Berney |
| 2003/0210808 A1 | 11/2003 | Chen |
| 2004/0098481 A1 | 5/2004 | Gunji |
| 2004/0104266 A1 | 6/2004 | Bolle |
| 2004/0111313 A1* | 6/2004 | Ingman ............... G06Q 10/06 705/7.16 |
| 2004/0199663 A1* | 10/2004 | Horvitz ............... G05B 19/404 709/238 |
| 2004/0228504 A1 | 11/2004 | Chang |
| 2005/0018883 A1 | 1/2005 | Scott |
| 2005/0108351 A1 | 5/2005 | Naick |
| 2005/0138391 A1 | 6/2005 | Mandalia |
| 2005/0144560 A1 | 6/2005 | Gruen |
| 2006/0010217 A1 | 1/2006 | Sood |
| 2006/0095369 A1 | 5/2006 | Hofi |
| 2006/0227997 A1 | 10/2006 | Au et al. |
| 2006/0248344 A1 | 11/2006 | Yang |
| 2006/0259778 A1 | 11/2006 | Gudorf |
| 2007/0271341 A1 | 11/2007 | Kumar |
| 2008/0126951 A1* | 5/2008 | Sood .................. H04L 51/26 715/752 |
| 2008/0253622 A1 | 10/2008 | Tosa et al. |
| 2008/0302870 A1 | 12/2008 | Berini |
| 2009/0182822 A1 | 7/2009 | O'Sullivan |
| 2009/0222913 A1 | 9/2009 | Fujii |
| 2009/0252383 A1 | 10/2009 | Adam et al. |
| 2009/0265106 A1 | 10/2009 | Bearman |
| 2010/0011428 A1 | 1/2010 | Atwood |
| 2010/0030798 A1 | 2/2010 | Kumar et al. |
| 2010/0067745 A1 | 3/2010 | Kovtun et al. |
| 2010/0169958 A1 | 7/2010 | Werner et al. |
| 2010/0251359 A1 | 9/2010 | Shirai |
| 2010/0287382 A1 | 11/2010 | Gyorffy et al. |
| 2010/0321156 A1 | 12/2010 | Pitt |
| 2011/0072039 A1 | 3/2011 | Tayloe |
| 2011/0072510 A1 | 3/2011 | Cheswick |
| 2011/0178962 A1 | 7/2011 | Sood |
| 2011/0208716 A1 | 8/2011 | Liu et al. |
| 2012/0023574 A1 | 1/2012 | Osborn et al. |
| 2012/0068820 A1 | 3/2012 | Millicone |
| 2012/0151377 A1 | 6/2012 | Schultz et al. |
| 2012/0157042 A1 | 6/2012 | McCanna |
| 2012/0158798 A1 | 6/2012 | Patil |
| 2012/0167199 A1 | 6/2012 | Riddiford |
| 2012/0169461 A1 | 7/2012 | Dubois, Jr. |
| 2012/0200567 A1 | 8/2012 | Mandel |
| 2012/0255995 A1 | 10/2012 | Ahmed |
| 2012/0291120 A1 | 11/2012 | Griffin |
| 2012/0319817 A1 | 12/2012 | Abe |
| 2013/0055362 A1 | 2/2013 | Rathbun |
| 2013/0117059 A1 | 5/2013 | Norton et al. |
| 2013/0262333 A1 | 10/2013 | Wicker |
| 2013/0268775 A1 | 10/2013 | Hawkins |
| 2013/0340061 A1 | 12/2013 | Tsukamoto |
| 2013/0346067 A1 | 12/2013 | Bhatt |
| 2014/0002238 A1 | 1/2014 | Taveau |
| 2014/0007185 A1 | 1/2014 | Han et al. |
| 2014/0096196 A1 | 4/2014 | O'Connor |
| 2014/0137221 A1 | 5/2014 | Dominic et al. |
| 2014/0181956 A1 | 6/2014 | Ahn et al. |
| 2014/0268243 A1 | 9/2014 | Mitsubori |
| 2014/0270404 A1 | 9/2014 | Hanna |
| 2014/0347479 A1 | 11/2014 | Givon |
| 2014/0363058 A1 | 12/2014 | Emmett |
| 2015/0039527 A1 | 2/2015 | Hanna |
| 2015/0200899 A1 | 7/2015 | Sanketi |

FOREIGN PATENT DOCUMENTS

| | | |
|---|---|---|
| WO | WO 2009/067738 | 6/2009 |
| WO | WO 2012/164385 | 12/2012 |

OTHER PUBLICATIONS

International Search Report, dated Nov. 24, 2014.
Written Opinion of the International Searching Authority, dated Nov. 24, 2014.
European Patent Office Communication and Supplementary European Search Report, European Patent Application No. 14794941.6, dated Nov. 18, 2016, pp. 1-8.

* cited by examiner

SYSTEMS AND METHODS FOR ELECTRONIC MESSAGE PRIORITIZATION

RELATED APPLICATIONS

This application claims the benefit of U.S. Provisional Patent Application Ser. No. 61/861,171 filed Aug. 16, 2013, and U.S. Provisional Patent Application Ser. No. 61/888,909, filed Oct. 9, 2013. The disclosures of each are hereby incorporated, by reference, in their entireties.

BACKGROUND OF THE INVENTION

1. Field of the Invention

The present invention generally relates to electronic communications, and, more particularly, to systems and methods for electronic message prioritization.

2. Description of the Related Art

Electronic messaging, whether it be electronic mail ("email"), short message service ("SMS"), or any other service, has become commonplace. It is not unusual for a user's electronic message "inbox" to contain hundreds, if not thousands, of messages.

SUMMARY OF THE INVENTION

Systems and methods for electronic message prioritization are disclosed. According to one embodiment, a method may include (1) accessing a message repository for a user, the message repository comprising a plurality of messages; (2) for each of the plurality of messages: (a) collect user behavior with regard to the message; (b) analyze the message; (c) generate an initial message priority based on the user behavior and the analysis; (d) compare the initial message priority to historical message priority data for the user; and (e) adjust the initial message priority based on the historical message priority data.

In one embodiment, the user behavior may be based on the time between message receipt and message access.

In one embodiment, the user behavior may be based on an action taken in response to the message. The action may include deleting the message, forwarding the message, replying to the message, ignoring the message, and spending time with the message.

In one embodiment, the user behavior may include the user indicating a message priority.

In one embodiment, the step of analyzing the message may include identifying at least one of a sender, a recipient, and a keyword; and updating the historical message priority data with a keyword that is not in the historical message priority data.

In one embodiment, the method may further include confirming the adjusted message priority.

Systems and methods for message prioritization for a recipient in an organization based on connectivity are disclosed. According to one embodiment, a method may include: (1) the at least one computer processor calculating an internal hierarchy score for a message based on a position of a sender of the message within the organization; (2) the at least one computer processor determining an associated project priority score for at least one project that is associated with the message; (3) the at least one computer processor calculating a related message priority connectivity score with high priority items; and (4) the at least one computer processor calculating a combined priority metric for the message based on the internal hierarchy score, the associated project priority score, and the related message score.

According to one embodiment, the message may be ranked among a plurality of messages in a message repository for the recipient based on the combined priority metric.

According to one embodiment, the internal hierarchy score for the message may be further based a position of a co-recipient of the message within the organization.

According to one embodiment, the method may include the at least one computer processor calculating an external network connection score for the sender based on the connection strength of the recipient and the sender in the external network, and the combined priority metric for the message may be further based on the external network connection score.

According to one embodiment, each of the internal hierarchy score, the associated project priority score, and the related message score may be assigned a weight.

According to one embodiment, the high priority items may include contacts and messages identified by the user as having a high priority.

Systems and methods for processing messages are disclosed. According to one embodiment, a method may include (1) at least one computer processor analyzing a message content; (2) the at least one computer processor identifying a request aspect in the message content; (3) the at least one computer processor identifying a time aspect in the message content; (4) the at least one computer processor identifying at least one project associated with the message content and retrieving the priority of the associated project; and (5) the at least one computer processor generating a custom weight factor based on the request, the time aspect, and the associated project priority.

According to one embodiment, the method may further include: the at least one computer processor retrieving a user priority list; the at least one computer processor determining a priority list priority based on the user priority list and the message content; and the at least one computer processor adjusting the custom weight factor based on the priority list priority.

According to one embodiment, the method may further include that at least one computer processor identifying at least one keyword in the message content; the at least one computer processor determining a keyword priority associated with the keyword; and the at least one computer processor adjusting the custom weight factor based on the keyword priority.

According to one embodiment, the method may further include the at least one computer processor extracting a snippet from the message content; and the at least one computer processor displaying a representation of the message with the snippet.

According to one embodiment, the method may further include the at least one computer processor determining a sentiment associated with the message content; and the at least one computer processor displaying a representation of the message with the snippet and a representation of the sentiment.

Systems and methods for graphically representing a plurality of electronic messages in an electronic message repository are disclosed. According to one embodiment, a method may include, for each of a plurality of electronic messages in an electronic message repository: (1) at least one computer processor determining a category for the electronic message; (2) the at least one computer processor determining a topic for the electronic message; and (3) the at least one computer processor identifying at least one related electronic message that is related to the electronic message. The at least one computer processor may graphically represent each of the plurality of electronic messages in relation to at least one of the topic, the category, and the related electronic message.

In one embodiment, the step of determining a category for the electronic message may include the at least one computer processor identifying a categorized electronic message that is associated with the electronic message; and the at least one computer processor assigning the electronic message a category for the associated categorized electronic message.

In one embodiment, the step of determining a topic for the electronic message may include the at least one computer processor identifying a project that is associated with the electronic message; and the at least one computer processor assigning the electronic message a category for the categorized electronic message.

In one embodiment, the step of at least one computer processor determining a topic for the electronic message may include the at least one computer processor analyzing a content of the electronic message for at least one topic; the at least one computer processor rating the contents based on the at least one topic and a related word/expression match; the at least one computer processor identifying a cluster with which to associate the electronic message; and the at least one computer processor assigning the electronic message a category associated with the cluster.

According to one embodiment, the message may also be graphically represented based on at least one of a date and time of receipt.

In one embodiment, the method may include the at least one computer processor determining a sentiment for the electronic message; and the at least one computer processor graphically representing the sentiment for the electronic message as a color.

In one embodiment, the electronic message may be graphically represented as an icon, a dot, without electronic message content, etc.

Systems and methods for processing outgoing electronic messages are disclosed. According to one embodiment, the method may include (1) receiving an electronic message comprising an electronic message header including at least one of an action owner, an approver, and a commentator; (2) at least one computer processor converting the electronic message header to a standard message header including at least one of a sender and a recipient; and (3) the at least one computer processor transmitting the electronic message to the at least one recipient.

In one embodiment, the message header may include functional role.

In one embodiment, the method may further include the at least one computer processor linking the electronic message to a project workspace.

In one embodiment, the method may further include presenting the electronic message to the recipient based on a recipient role, wherein the electronic message is displayed differently for each of a plurality of recipient roles. The recipient role may be an owner, a management, a commentator, or a functional role.

Systems and methods for automated scheduling of meetings are disclosed. According to one embodiment, the method may include (1) at least one computer processor receiving an identification of at least one meeting invitee for a meeting; (2) the at least one computer processor retrieving meeting availability for the at least one meeting invitee; (3) the at least one computer processor determining a target date and time for the meeting; (4) the at least one computer processor verifying that the at least one meeting invitee has meeting availability at the target date and time; (5) the at least one computer processor scheduling at least one meeting resource; and (6) the at least one computer processor inviting the at least one invitee to the meeting.

In one embodiment, the target date and time for the meeting may be determined from the content of a related electronic message.

In one embodiment, the steps of receiving an identification of at least one meeting invitee for a meeting, retrieving meeting availability for the at least one meeting invitee, and determining a target date and time for the meeting may be performed without human intervention.

In one embodiment, the resource may be a conference room, a teleconference bridge, and/or a videoconference bridge.

Systems and methods for prioritizing electronic messages in an electronic message repository are disclosed. According to one embodiment, a method may include (1) at least one computer processor determining an amount of message review time for a user; (2) the at least one computer processor estimating a number of electronic messages that the user can review in the message review time; (3) the at least one computer processor determining a priority level for a plurality of electronic messages in the user's electronic message repository; (4) the at least one computer processor selecting electronic messages from the user's electronic message repository based on the estimated number of electronic messages that the user can review and the priority level for the electronic messages.

In one embodiment, the amount of message review time may be based on a location of the user. The location may a current location, a future/anticipated location, etc.

In one embodiment, the amount of message review time may be based on a calendar for the user.

In one embodiment, the at least one computer processor may determine an access device characteristic on which the electronic messages will be reviewed; and the amount of number of electronic messages that the user can review in the message review time is based on the access device characteristic.

In one embodiment, the method may further include the at least one computer processor determining an access device characteristic on which the electronic messages will be reviewed; and the at least one computer processor selects the electronic messages from the user's electronic message repository further based on the access device characteristic.

In one embodiment, the method may further include the at least one computer processor retrieving the selected electronic messages.

In one embodiment, the method may further include the at least one computer processor pushing the selected electronic messages to the user's access device.

Systems and methods for preprocessing electronic messages are disclosed. According to one embodiment, a method may include (1) at least one computer processor receiving an identification of a recipient for a draft electronic message being drafted by a sender; (2) the at least one computer processor retrieving recipient electronic message delivery priority data; and (3) the at least one computer processor determining projected delivery information for the draft electronic message based on the recipient electronic message delivery priority data and the draft electronic message content.

In one embodiment, the recipient electronic message delivery priority data may be based on a number of messages in an electronic message repository for the recipient.

In one embodiment, the recipient electronic message delivery priority data may be based on an availability of the recipient to review electronic messages.

In one embodiment, the recipient electronic message delivery priority data may be based on a location for the recipient.

In one embodiment, the method may further include the at least one computer processor identifying a change in content that changes the projected delivery information; and the at least one computer processor providing the identified change in content to the sender.

In one embodiment, the change in content may raise, or increase, a priority level for the draft electronic message.

In one embodiment, the method may further include the at least one computer processor identifying a change in recipient that changes the projected delivery information; and the at least one computer processor providing the identified change in recipient to the sender.

In one embodiment, the method may further include the at least one computer processor receiving at least one of a change in content for the draft electronic message and a change in recipient; and the at least one computer processor revising the projected delivery information for the draft electronic message based on the at least one of a change in content for the draft electronic message and a change in recipient.

Systems and methods for processing incoming electronic messages are disclosed. In one embodiment, the method may include (1) receiving, at a recipient electronic message controller for a recipient and from an electronic message controller for a sender, each electronic message controller comprising at least one computer processor, an incoming electronic message having a sender priority; (2) the recipient electronic message controller recipient electronic message delivery priority data; and (3) the recipient electronic message controller estimating a priority for the incoming electronic message based on the recipient electronic message delivery priority data.

In one embodiment, the method may further include the recipient electronic message controller estimating a processing time for the incoming electronic message.

In one embodiment, the method may further include the recipient electronic message controller determining that the estimated priority and estimated priority time does not meet the sender priority; and the recipient electronic message controller informing the sending electronic message controller that the incoming electronic message will not meet the sender priority.

In one embodiment, the method may further include the recipient electronic message controller negotiating a revised electronic message priority for the incoming electronic message with the sender electronic message controller.

In one embodiment, the method may further include the recipient electronic message controller determining that the estimated priority and estimated priority time is at least the same as the sender priority; and the recipient electronic message controller delivering the electronic message to the recipient with the estimated priority.

In one embodiment, the recipient electronic message delivery priority data may be based on a number of messages in an electronic message repository for the recipient.

In one embodiment, the recipient electronic message delivery priority data may be based on an availability of the recipient to review electronic messages.

In one embodiment, the recipient electronic message delivery priority data may be based on a location for the recipient.

In one embodiment, machine learning based message prioritization that is based on users behavior is disclosed. For example, the user's response patterns, time to respond, time to read, order of read, time and order of action (e.g., respond, forward, schedule, email, etc.) may be considered to prioritize messages.

In one embodiment, message prioritization based on a user's prioritization feedback is disclosed. In one embodiment, the feedback maybe explicit, such as mouse or touchscreen up/down movement while closing a message, or implicit, such as leaving a message unread or un-accessed.

In one embodiment, message prioritization that may be based on collective feedback from the receivers of a group messages is disclosed. For example, a message that is given a low priority or unread by a group of people may be given a low priority for all receivers.

In one embodiment, dynamic prioritization adaptation techniques that may be based on tracking changes in a user's behavior and adapting to changes of length and significance over specified thresholds In one embodiment, message prioritization that may be based on implicit learning of keywords, names and other variables (such as a person's name, company or project name) is disclosed.

In one embodiment, combined metric-based priority calculation of messages through one of more of behavioral profiling (explicit, implicit feedback), history behavior, keyword or priority proximity, etc. is disclosed.

In one embodiment, message prioritization that may be based on graph connectivity metric functions, such as social connectivity, connectivity through internal organization hierarchy, connectivity through shared work/projects, management overlap score, distance in hierarchy level in the organization, etc. is disclosed.

In one embodiment, techniques to calculate the message prioritization that may be based on graph connectivity functions through accessing and ranking data in other forms (social connectivity data, message editors/logs/history, enterprise/organization project databases workspaces, etc.) are disclosed.

In one embodiment, message prioritization that may be based on a metric distance to other high priority messages or connections in a user's mailbox is disclosed.

In one embodiment, message prioritization may be based on a combined metric calculated from a recipient's profile characteristics (such as recipients mail queue length, calendar availability, message throughput, message reception and processing rate, project and deadline markers, traveling, other personal info, etc.).

In one embodiment, techniques for message prioritization that may be based on a user's available time, such that a number and expected processing time of messages may be calculated and optimized to match the user's calendar availability, are disclosed.

In one embodiment, message prioritization may be based on a user's travel pattern such that messages from local senders in terms of geographical distance while traveling may be given a higher priority.

In one embodiment, message prioritization may be based on a user's accessing pattern in terms of device such that message content and attachments that are not optimally accessed on a mobile device receive different prioritization.

In one embodiment, message prioritization techniques may include the following components: User message controller, User message controller policy and preferences, Enterprise/Organization messaging control and prioritization engine, User history and profile tables, User message inbox/outbox, Learning and dynamic profile tracking engine, bandwidth/queue engine, etc. Other components may be used as necessary and/or desired.

In one embodiment, user-level controllers may negotiate the priority of the incoming/outgoing message and if the message will be received.

In one embodiment, an enterprise/organization messaging controller may oversee the process of messaging controller interactions and message exchange patterns and may create a priority for messages through collecting priority from all parties involved, history behavior, policies preferences, etc.

In one embodiment, a dynamic profile and learning engine that tracks a user's behavioral profile phases and identifies phase patterns to adopt, switches between phases as pattern identified, etc. is disclosed.

In one embodiment, local history, priority and user preference modules that may track and store required priority level for prior messages delivered, previous messages sent/received time stamps, unsuccessful delivery messages, user policies, etc. are disclosed.

In one embodiment, a bandwidth engine that may calculates a user's message processing speed and patterns by tracking incoming and outgoing message and activity traffic are disclosed.

In one embodiment, graph databases and profile tables that may store individual user profiles, connectivity through projects/socially/enterprise hierarchy, external connectivity, message exchange connectivity (connectivity info can be stored in graph databases, other profile data can be stored in profile tables or other) are disclosed.

In one embodiment, text analytics techniques that track keywords, word-action item associations and natural language processing of the incoming and outgoing messages to determine the priority and action items of the messages are disclosed.

In one embodiment, text analytics techniques that involve priority negotiation between sender and receiver message controllers are disclosed.

In one embodiment, a text analytics editor engine that dynamically proposes text and keywords for effective prioritization of outgoing messages through drafting is disclosed.

In one embodiment, techniques for customized sentiment extraction and visualization of message through natural language processing, keyword weight factors and learned user behavior are disclosed.

In one embodiment, sentiment visualization of an inbox may be based on an extracted sentiment signal of individual messages and text snippets.

In one embodiment, sentiment visualization-based prioritization of messages is disclosed. Extremes in the sentiment spectrum may be ranked higher (highly negative or highly positive messages are marked) that non-extremes.

In one embodiment, sentiment extraction and visualization of individual message threads over time is disclosed.

In one embodiment, hierarchical auto classification of message through external taxonomy guidelines is disclosed.

In one embodiment, nearest neighbor-based classification may be based on multi-dimensional vector calculation on known dimensions.

In one embodiment, large scale sentiment extraction and prediction may be based on extracted sentiment.

In one embodiment, the extraction of sentiment from messages may be based on geography/functional role/other location/project and technique to user extracted sentiment to predict problems and create firm-level warning messages (esp. when negative sentiment is negative).

In one embodiment, techniques for mining a user's mailbox, calendar, history to extract and predict skills are disclosed.

In one embodiment, techniques may be based on metric-based function tracking keyword matching, temporal analysis, natural language analysis, connectivity and frequency matching of entries in mailbox.

In one embodiment, techniques to feed in mailbox mining to identify experts with specific skill sets and know-how/info extraction for back-end skill exchange and data extraction platforms are disclosed.

In one embodiment, techniques for additional action-menu based processing and visualization of message or electronic messages are disclosed.

In one embodiment, techniques that use job functional or project functional processing and visualization of message may be based on add-on layer of functional role button and processing knobs are disclosed.

In one embodiment, visualization techniques that link the graph connectivity and functional role/organization wide employee databases to visualize sender/receiver and functional role information through the presentation of the message to the users are disclosed.

In one embodiment, drag and drop-based scheduling of meetings or project action items from visual graph databases of connections/recipients is disclosed.

In one embodiment, direct linking of message action and functional roles in the mailbox to the functional or project roles in enterprise/organization databases or workspaces is disclosed.

In one embodiment, visualization for the graph databases that represent the connectivity information among users, socially/project/enterprise hierarchy/external hierarchy or others is disclosed.

In one embodiment, two dimensional visualization of a user's inbox is disclosed. The visualization may include several layers. For example, the visualization may be presented in different timescales, such as weeks, months, years, etc.

In one embodiment, visual clustering of messages as points, lines, threads, etc. may be based on connectivity among messages. For example, the connectivity may be based on calculated metrics for proximity in a multi-dimensional vector space.

In one embodiment, three dimensional visualization of the user's inbox is disclosed.

In one embodiment, multi-layer processing of the visualization, linking different connectivity and inbox layers to each other is disclosed. For example, a graph connection view linking to inbox is disclosed.

In one embodiment, techniques to dynamically render and move among a variety of visualization layers for, for example, a user's inbox, projects, connections are disclosed.

In one embodiment, visualization of sentiments for incoming messages or full mailbox and related keywords, projects, topics is disclosed.

In one embodiment, visualization of sentiments for incoming messages or full mailbox temporally is disclosed.

In one embodiment, visualization of sentiments for mailbox through color coding or other methods is disclosed.

In one embodiment, visualization of sentiment through different geos/topics/projects at organization level is disclosed.

In one embodiment, visualization of messages through text analytics through event based connectivity is disclosed.

In one embodiment, hierarchical visualization of messages in terms of topics and keywords in two dimensions is disclosed.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
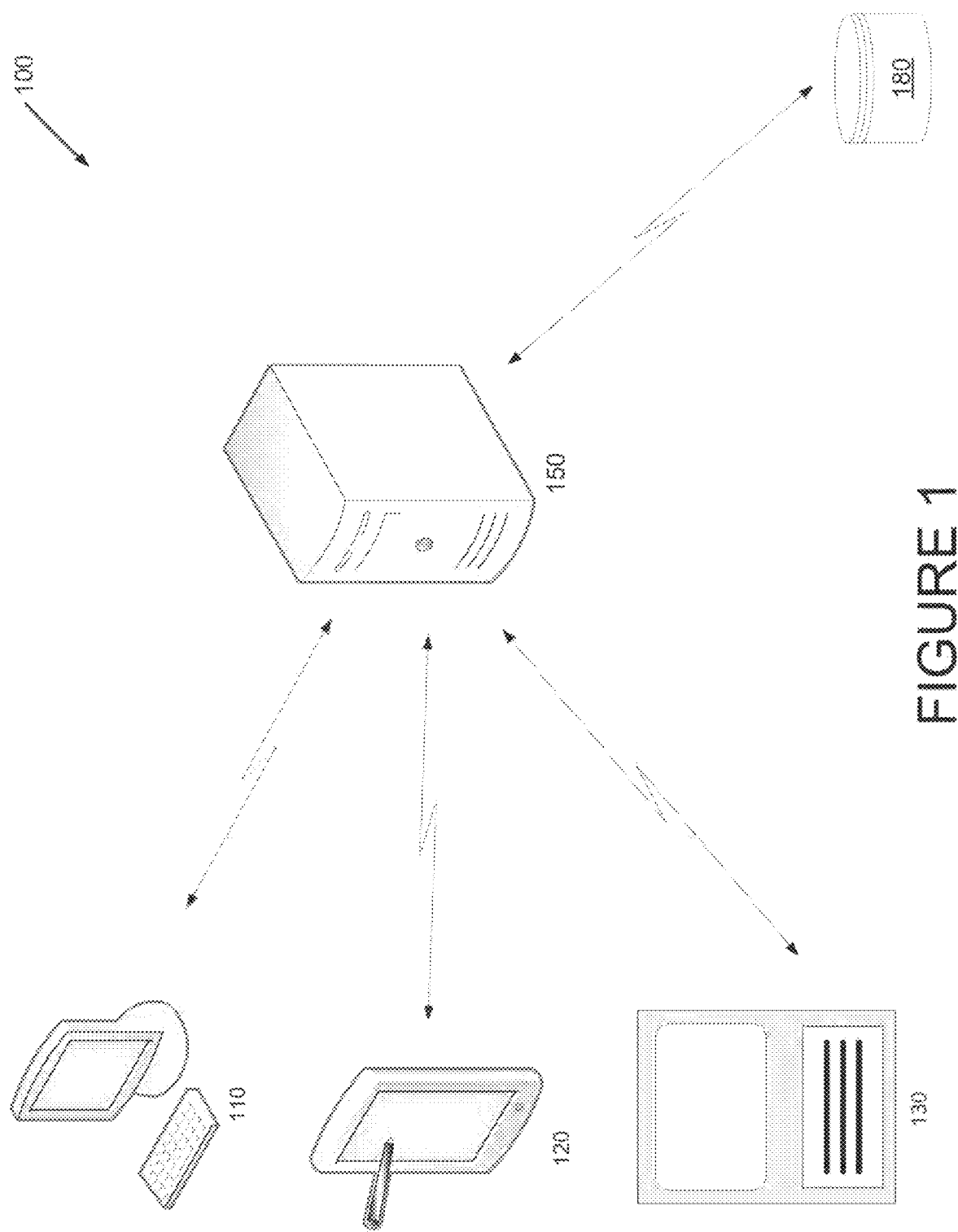
FIG. 1 is a block diagram of a system for electronic message prioritization according to one embodiment.

Several embodiments of the present invention and their advantages may be understood by referring to FIGS. 1-14, wherein like reference numerals refer to like elements.

Embodiments relate to the prioritization of incoming electronic messages, such as email, and the use of machine learning and advanced visualization techniques to assist in prioritizing and presenting messages to users.

A prioritization system may use the relationship, if any, between the sender and the receiver to determine a priority to give an incoming message. For example, a sender and a receiver may have an internal connectivity (e.g., co-workers within the same organization), a professional relationship, a personal relationship (professional, social, family, etc.), or no relationship. The system may use these relationships, along with any associated hierarchies (e.g., organization chart) to rank incoming messages.

In one embodiment, messages that have already been received may be processed and prioritized using this same system. In another embodiment, messages may be processed and re-prioritized more than once as additional user behaviors are learned.

In one embodiment, the system may predict a user's message prioritization behavior may be based on past activity. For example, an incoming message may be associated with the following data: (1) a time of receipt or first presentation to the user (e.g., sender/title of message first presented to the user in an inbox); (2) a time that the message was first read, accessed, or otherwise disposed of (e.g., opened, skipped, deleted, made phone call, etc.); (3) the length of time between the time of first presentation and the time of disposal; and (4) the action taken by the user (e.g., respond, flag for later follow-up, subsequent accesses, forward to other parties, calendaring, deletion, etc. and the time at which that action was taken.

In one embodiment, user's behavior may be used to predict the user's action for incoming messages, stored messages, etc. and to prioritize those messages. For example, if messages from a first sender are always responded to immediately upon reading, those messages will be given a high priority. If messages from a second sender are always deleted without reading, or ignored, those messages will be given a low priority.

In one embodiment, the device on which email is presented may be considered. For example, a user may be less likely to respond to a message with an attachment when it is presented on a smartphone than if it is presented on the user's desktop or laptop computer. In another embodiment, the type of message (e.g., attachment, plain text, etc.) may be considered. In still another embodiment, the location of the user when the message was first presented (e.g., office, home, remote, etc.) may be considered. In yet another embodiment, the activity of the user (e.g., what the user was doing when the email was first presented, such as working on a document, on a conference call, scheduled as busy, etc.) as well as other factors to predict the user's future behavior.

In one embodiment, text analytics may be used to determine message priority. For example, the following may be considered: (1) action requests and questions that may require an action (e.g., "Please send a file to John", "Can you please share this with me?", etc.); (2) meeting requests (e.g., "Can we find some time to meet next week" may be moved automatically to a calendar queue with availability; (3) keyword matching with prior emails (e.g., keyword matching, overall text matching, matching the distribution list, etc.) (4) sentiment analytics (customized sentiment library for corporate emails to preprocess, color code/categorize and prioritize email); and (5) hierarchical auto classification of keywords may be based on, for example, public information-based classification or internal classification (such as client/product classification, etc.)

In one embodiment, an action menu may be provided in addition to the normal to, cc, bcc message headers that may specify roles for follow-up. For example, the sender may see the action owner, reviewer/commentator, management approver, and an escalation reviewer on a message. These categories may be used to further categorize and rank emails, and different tabs may be provided for each category (e.g., owner, reviewer, management support).

In one embodiment, exchanges may occur on a collaboration platform, with only notifications/alerts sent as email.

In one embodiment, nodes may be provided (with pictures and information on users) from who-knows-whom corporate or personal network to send an email or schedule a meeting.

In one embodiment, advanced visualization techniques may be used to display emails to a user. For example, emails in an inbox may be represented graphically. An "auto visualization" approach may display each cluster as a separate thread (on a star scale for the most recent few months). Each thread may be auto-classified may be based on known classification. Each thread may have a normalized timeline, where each dot may represent an email and a response. When each dot is "zoomed in on" or clicked, the message/response will be presented.

A three dimensional version may be used to cover a greater time period, such as months, years.

Referring to FIG. 1, a system for electronic message prioritization according to one embodiment is disclosed. System 100 may include an electronic messaging device, including, for example, workstation 110 (e.g., any suitable computer, including for example, desktop computers, laptop computers, notebook computers, etc.), mobile electronic device 120 (e.g., a smartphone (e.g., Apple iPhone, Samsung Galaxy, etc.), a tablet computer (e.g., Apple iPad, Samsung Galaxy, Amazon Kindle, Barnes & Noble Nook Tablet, etc.), music/mp3 players (e.g., iPod Touch), Google Glass, Smart E-watch/Bracelet, etc.), kiosk 130, and any suitable device capable of receiving electronic messages.

System 100 may further include server 150. In one embodiment, server 150 may be (or may host) a message server, such as a Microsoft Exchange Server, Postfix, Exim, Sendmail, etc. Although only one server is depicted in FIG. 1, more than one server may be provided.

Database 180 may receive, store and/or maintain user information, account information, message prioritization information, etc.

Workstation 110, mobile electronic device 120, kiosk 130, etc. may communicate with server 150 over any suitable network, including the Internet, a local area network, wide area network, virtual private network, etc.

Figure 2:
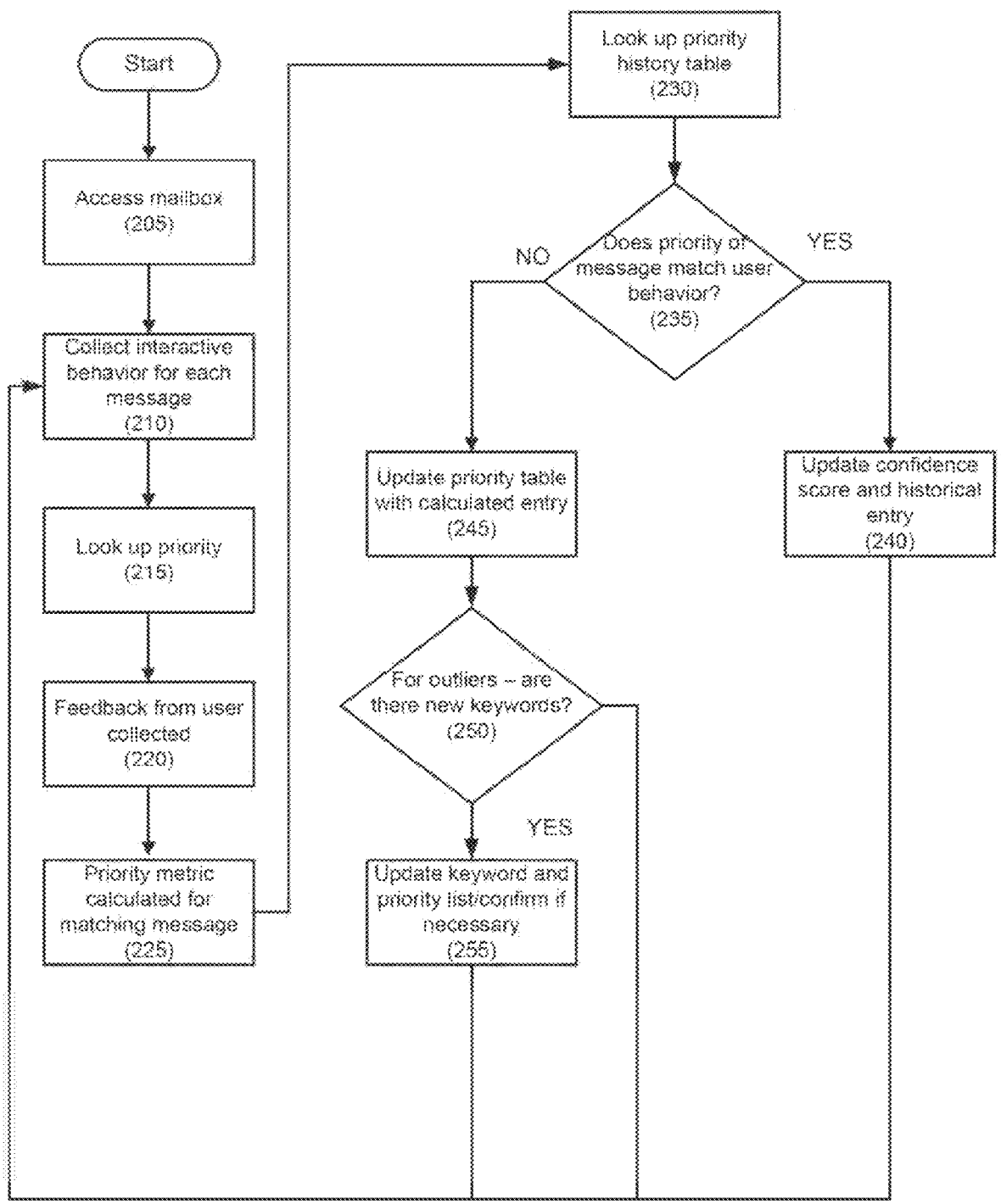
FIG. 2 is a flowchart depicting a method for learning user mail prioritization according to one embodiment.

Referring to FIG. 2, a method for learning user mail prioritization according to one embodiment is provided.

In step 205, a message may be retrieved from a user's message repository, such as the user's email inbox. In another embodiment, a message may be processed as it is received. In still another embodiment, a message may be processed after it is reviewed by the user.

In one embodiment, a user's mailbox may contain N unread messages/emails. Each message/email may have a corresponding time stamp.

In step 210, the user's behavior with regard to the message may be collected. For example, the system may consider the time from receipt or first presentation to the user until the user reads or otherwise acts on the message, the order in which the message is read or acted on, the action taken by the user (e.g., forward, reply, delete, etc.), the time spent reading or action on the message, etc.

In step 215, the message may be analyzed. In one embodiment, the sender and any other recipients may be identified, the message importance may be identified, keyword(s) may be extracted, etc.

In one embodiment, the analyzed information may be compared to priority lists. For example, the sender may be compared to a business hierarchy. Keywords may be compared to a list of high priority keywords. Other comparisons may be made as necessary and/or desired.

In one embodiment, if the message matches a priority list entry, a matching factor may be calculated.

In step 220, feedback for the specific message or group of messages may be received from the user. For example, the user may indicate a priority for the message by "mousing" upwards or downwards, using the scroll wheel, clicking a priority indicator, or by any suitable method or technique.

In one embodiment, an upward movement may signify a higher priority, while a downward movement may signify a lower priority.

In step 225, a priority metric for the message or group of messages may be calculated. In one embodiment, the combined priority metric may be based on two or more of the following factors: interactive user behavior, explicit user feedback, history table, keyword match, and priority match. In one embodiment, each factor may be given a specific weighing. The factors that are considered and the weighting may be based, for example, the individual, the organization, etc. and may vary as necessary and/or desired.

In step 230, the user's priority history for messages may be retrieved from, for example, a database. In one embodiment, the priority history table may be indexed by, for example, user, project, topic, etc.

In step 235, a check is made to see if the priority metric matches the priority history. If it does, in step 240, a confidence score may be updated along with the historical database.

If the priority metric does not match the priority history, in step 245 the priority history may be updated. In addition, any new keywords may be added to the priority list.

In step 250, a check is made to see if there are any new keywords in the message. In one embodiment, this may be for the high and low end of the priority spectrum.

If there are, in step 255, the keyword and/or priority list may be updated. In one embodiment, the user may be asked to confirm the update if the confidence in the keywords is not above a predetermined threshold.

Figure 3:
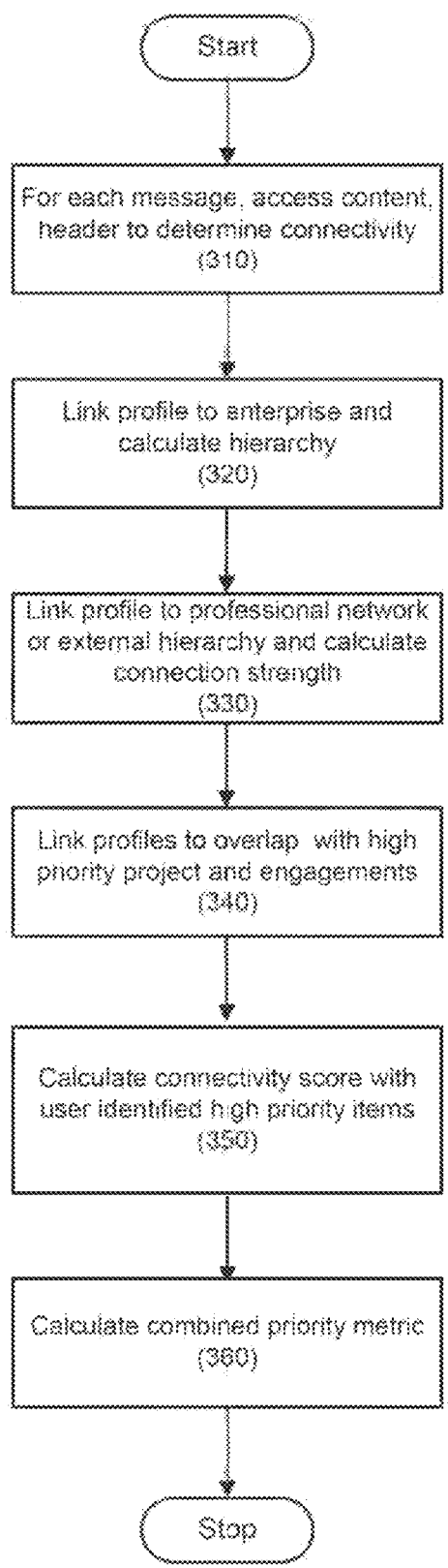
FIG. 3 is a flowchart depicting a method for determining a priority of an electronic message according to one embodiment.

Referring to FIG. 3, a method for determining a priority of an electronic message is provided. In step 310, for each incoming email, email content, header information, etc. may be accessed to determine connectivity.

In step 320, the system may calculate a hierarchy priority score for the message. In one embodiment, the hierarchy priority may be calculated based on, for example, management overlap for the sender and any other recipients, distance in the hierarchy between the sender and the user level in the hierarchy for the sender and any other recipients within the user's organization, any project overlap for the sender and the user, etc.

In one embodiment, the user's profile may be linked to the organization's hierarchy, and the hierarchy strength may be calculated based on, for example, management overlap, distance, level in hierarchy, organization, project overlap, etc. In one embodiment, a first weight may be given to the sender, a second weight to cc's, etc. The weightings may then be normalized.

In step 330, the strength of connection score for the connection between the sender and the user may be determined. For example, in one embodiment, the sender's profile may be analyzed for connections with the user's professional network. In another embodiment, the sender's profile may be analyzed for connections with the user's contacts, personal hierarchies (e.g., Facebook friends, etc.), etc. Other sources of connections may be analyzed as necessary and/or desired.

In one embodiment, the strength of connection score may be determined based on, for example, the connection distance (e.g., first level connection, second level connection, etc.), the number of shared connections, the number of connections with the organization, the connections within a project, etc.

In step 340, the overlap score for any associated high priority projects and/or engagements within the organization may be determined. For example, a "score" may be calculated based on the project priority and the number of associated projects within the organization. In one embodiment, the score may be calculated as the project priority multiplied by the associated project count. In another embodiment, if there are multiple priorities, the sum of each project priority may be calculated.

In step 350, the connectivity score with the user's existing high priority emails or contacts that may be specified by the user may be determined. In one embodiment, the user may identify messages having certain subjects, senders, other addressees, etc. that will have a high priority. In another embodiment, the user may also identify messages having subjects, senders, other addressees, etc. that may have a low priority. In another embodiment, the user may set up folders, rules, etc. that handle these high or low priority messages as they are received.

In step 360, a combined priority metric may be calculated for the message. For example, one or more of the hierarchy priority score, the strength of connection score, the overlap score, the connectivity score, the interactive user behavior score, etc. may be considered and may be weighted as necessary and/or desired. In one embodiment, the scores may be added, averaged, etc. as is necessary and/or desired. In one embodiment, the scores may be given different weightings as is necessary and/or desired.

As noted above, in one embodiment, messages may be processed using text analytics. In one embodiment, messages may be analyzed for action requests and/or questions that may require a response and/or action from the user. For example, a message may include requests such as "Please send this folder to John", "Could you please share specifications?", etc.

In one embodiment, messages may be analyzed for tasks that may be auto-processed. For example, a request such as "Can we find some time for a meeting next week" may be moved to a calendar queue, along with potential matching availability for the sender and the user. From the calendar queue, the user may simply initiate the calendar meeting process at the identified time.

In one embodiment, words in a message may be checked for matches with high-priority messages. For example, keyword matching, overall text matching, distribution list matching, etc. may be used.

In one embodiment, sentiment analysis maybe used. In one embodiment, a library of keywords, such as "unsuccessful," "outage," "urgent," "problematic," "resolve," "complaint," "issue," disagreement," etc. may be used. In one embodiment, the library may be customized for the user, the user's position, the user's environment, etc. as is necessary and/or desired.

The keywords, along with their location in sentences, within the message, response, etc. maybe used to perform sentiment analysis.

In one embodiment, long message threads may be associated with a "sentiment timeline" whereby each message in the thread may have a sentiment.

In one embodiment, a hierarchical automatic classification of keywords may be based, for example, on an organization taxonomy (e.g., client/product taxonomy), third party taxonomy (e.g., Wikipedia), etc.

In one embodiment, different tabs may be based on topic, technology, etc. For example, an IT database specialist may have his or her messages categorized based on database type identified in the title or body, such as NoSQL, MongoDB, Cassandra, etc.

In one embodiment, messages may be sorted and classified according to publicly available taxonomy automatically.

In one embodiment, message threads may be based on the taxonomy.

In another embodiment, the K-nn (K nearest neighbor clustering of emails) for clustering may be used.

Each field may have different weight factors for clustering (Subject keyword match*Frequency of keyword), text matching (based on both keyword matching and overall text matching).

Given the emails already clustered by the user—an incoming set of emails, the nearest distance based cluster to assign the email to (multi-dimensional matching) may be determined. For example, each message may be assigned a "vector" based on one or more of the calculated scores. The vector for each message may be compared to vectors for other messages to cluster the messages. In one embodiment, as additional messages are processed, messages may be re-clustered as necessary and/or desired.

Figure 4:
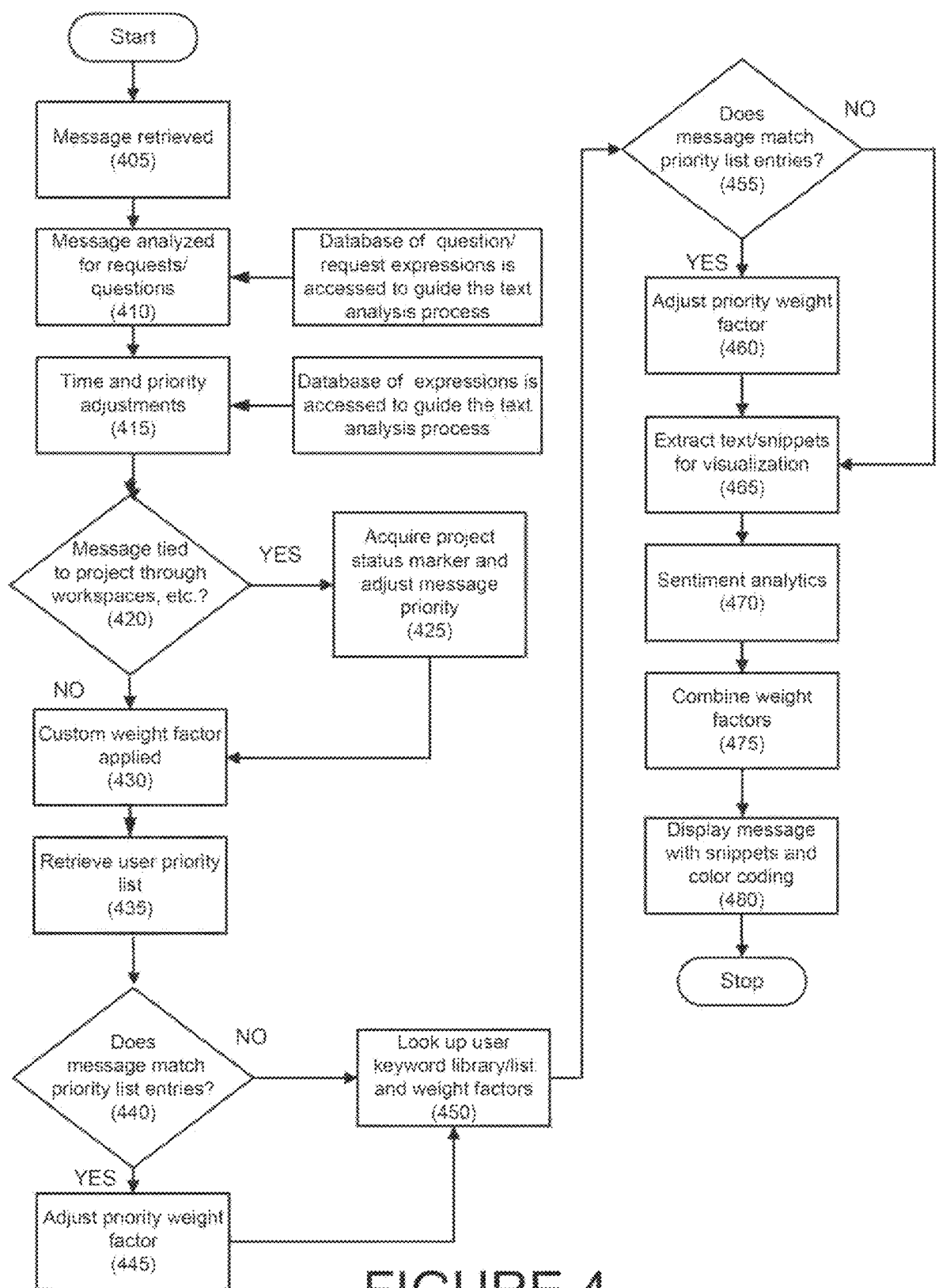
FIG. 4 is a flowchart depicting a method of using text analytics on a message according to one embodiment.

Referring to FIG. 4, a method of using text analytics on a message according to one embodiment is disclosed. In step 405, a message may be retrieved for preprocessing. In one embodiment, the message may be from a user's message repository (e.g., inbox), an incoming message, a filed message, etc.

In step 410, the message may be analyzed for any requests, action items, questions, etc. that may be contained therein. In one embodiment, the message may be searched for keywords, In one embodiment, a database of question/request expressions may be accessed to guide the text analysis process. This data base may identify natural question format (e.g., punctuation), an indirect question format (e.g., "was wondering," "curious if," "wanted to see if," etc.), a request format (e.g., need, share document, advise, etc.).

In step 415, time and priority adjustments may be made by, for example, analyzing the message for time markers and question/request/action item markers. For example, a message with short time period for response/action may be given a higher priority than a message that sets out a longer response/action period.

In one embodiment, a database of expressions may be accessed to guide the text analysis process. This data base may identify words/phases, such as "ASAP," "end of day," "end of week," "tomorrow," "today," "Outage," "deadline," "final review," "client meeting," "Executive review/" etc.

In step 420, the message may be analyzed for any association with existing projects, collaborations, etc. In one embodiment, the user's workspaces may be analyzed to determine if the message is related to any projects based on keywords, other addressees, etc.

If the message is related, in step 425, the status or priority of the project may be retrieved, and the message priority may be adjusted as necessary. In one embodiment, the message priority may only be adjusted to a higher priority. For example, if a message was determined based on a request, question, etc. to have a high priority, but is associated with a low priority project, the message priority will remain unchanged.

In another embodiment, the message priority may be changed to a higher or lower priority based on the project.

If the message is not associated with a project, or after the priority is adjusted, in step 430, a custom weight factor may be calculated for the message based on one or more factor. In one embodiment, the custom weight factor may consider more than one of the request markers/scores, action markers/scores, question markers/scores, time markers/scores, priority markers/scores markers. In one embodiment, the factors may be given different weightings.

The number of factors considered and the weightings may be selected as necessary and/or desired.

In step 435, a user project/topic priority list may be retrieved. In one embodiment, the priority list may be based on input from the user (e.g., self-identification of high priority (and/or low, medium, etc. priority) projects, topics, keywords, etc. In another embodiment, the priority list may be based on learned user behavior, as discussed above. In another embodiment, a combination of both may be used.

In step 440, the system checks to see if the message priority matches the user's priority list. In one embodiment, a matching factor that indicates the match between the message and the priority list may be calculated to determine a match.

If message priority does match, or the matching factor is above a certain threshold, in step 445, the weight factor may be adjusted, and a snippet may be extracted from the message. For example, the weight factor may be incremented, the occurrence may be noted, etc. In one embodiment, the snippet may be represent the matching element from the message.

In step 450, the user keyword library list and weight factors may be retrieved. In one embodiment, the user keyword library list and weight factors may be retrieved from, for example, a database.

In step 455, the system checks to see if the message matches the user's priority list entries. In one embodiment, a matching factor that indicates the match between the message and the priority list entries may be calculated to determine a match.

If it does not match, or the matching factor is not above a certain threshold, in step 460, the weight factor may be adjusted, and a snippet may be extracted from the message.

In step 465, one or more snippets may be extracted for visualization. In one embodiment, the snippet may be representative of message content that determined the priority of the message. In one embodiment, the snippet(s) may have a length that may be restricted by character, word, etc.

In step 470, sentiment analysis may be performed on the message. In one embodiment, a customized sentiment library may be used.

In step 475, the weight factors, such as the custom weight factors for request/question/action with time and priority, user's priority weight factor, etc. may be combined to calculate a priority for the message.

In step 480, the message may be displayed with one or more selected snippets and the appropriate sentiment color/coding. For example, a sentiment signal may be displayed indicating positive or negative values over a period of time. Another example is color coding messages having negative sentiments with red, positive sentiment messages with blue, etc. Any suitable method of coding or coloring may be used as necessary and/or desired. In one embodiment, the user may customize the color and/or coding.

Although FIG. 4 depicts a multi-stage preprocessing starting with a project, message contents, and sentiment, it should be recognized that the multi-stage preprocessing may consider any message factors/attributes as necessary and/or desired.

Figure 5:
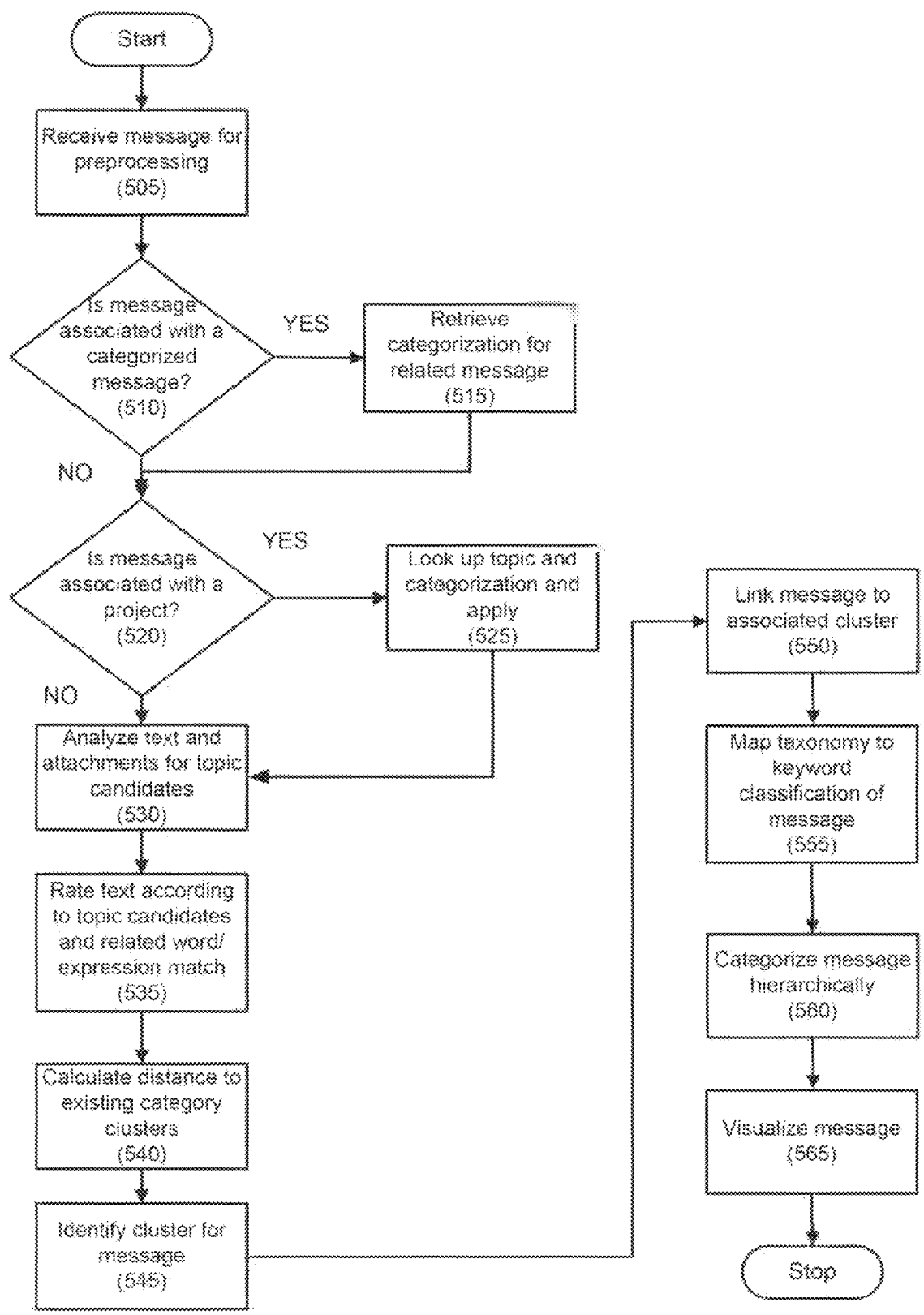
FIG. 5 is a flowchart depicting a method of centralized message processing using text analytics according to one embodiment.

In another embodiment, centralized processing using text analytics may be used to prioritize messages. Referring to FIG. 5, a flowchart depicting a method of centralized message processing using text analytics according to one embodiment is disclosed.

In step 505, a message may be retrieved. In one embodiment, the message may be retrieved from the user's message repository (e.g., inbox), folders, or as it is received.

In step 510, the message may be checked to see if it is associated with another message, or thread of messages, that has been categorized. If the message is associated with another categorized message or thread, in step 515, information on the related message may be retrieved. The message may then be categorized in the same manner as the related message or thread.

If the message is not related to another thread or message, in step 520, a check is made to see if the message is associated with a project. If it is, in step 525, the categorization, priority, etc. for the associated project may be retrieved, and the message may be categorized in the same way.

In step 530, the message and any attachments may be analyzed to extract topic candidates. In one embodiment, the topic candidates may be based on, for example, the title of the message, keywords (based on frequency of inclusion), matches to existing project and keyword libraries, matches with workspaces and databases, general expertise, etc. Any suitable topic candidates may be used as necessary and/or desired.

In one embodiment, the topic candidates may be provided as a list. In another embodiment, the topic candidates may be rank ordered based on their associated priorities.

In step 535, each topic candidate may be separately analyzed. In one embodiment, the topic candidates may be analyzed for related and correlated words. In another embodiment, the text may be rated according to a candidate topic list and a related word/expression match. For example, key words/phrases that may be considered for a database manager may include NoSQL, db, hadoop, server, node, set up, consistency, master, etc.

In step 540, a distance to existing category clusters may be calculated. For example, in one embodiment, a multi-dimensional vector distance may be calculated to titles, topic keywords, related word matches, overall text match, sender/cc list match, workspace/database link match, date/time, etc. The multi-dimensional vector may be compared to clusters of messages having similar vectors, and the distance (i.e., difference) from those clusters may be calculated.

In step 545, the message is associated with at least one cluster. In one embodiment, this may be based on the calculated distance in step 540. In one embodiment, a clustering algorithm, such as a K-nearest neighbor clustering algorithm, may be used.

In step 550, the message may be linked to the associated cluster for visualization and categorization.

In step 555, external, internal, and or user-specified taxonomy may be linked to the keyword categorization of the messages. For example, external taxonomy may be based on third party databases, such as Wikipedia. Internal taxonomy may be based on user workspaces.

In step 560, the message may be categorized hierarchically based on the taxonomy.

In step 565, the message may be visually presented to the user. For example, the message may be presented based on one or more of the topic, hierarchy and thread information.

Figure 6:
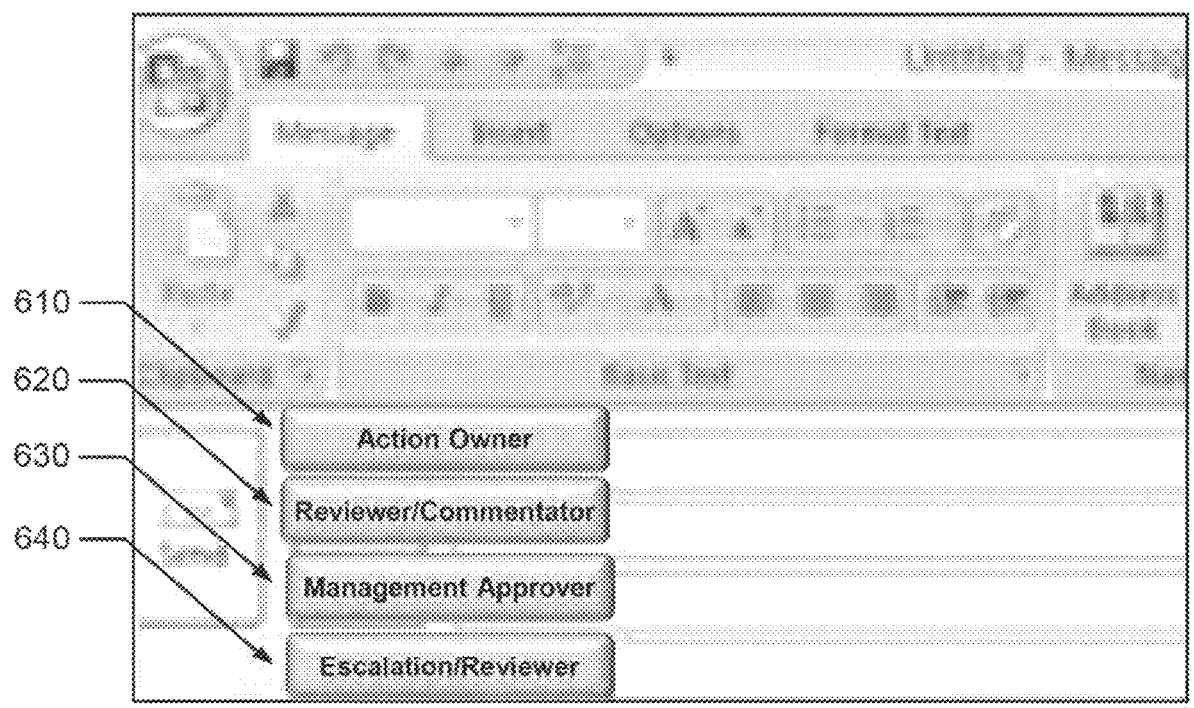
FIG. 6 is an example of a message header according to one embodiment.

In one embodiment, an "action menu" may be used to assist in categorization and prioritization of messages. Referring to FIG. 6, an exemplary screenshot depicting such an interface is provided. Instead of the normal to, cc, and bcc fields, different layers may be provided to assist in categorizing and prioritizing the message. For example, "Action Owner" field 610, "Reviewer/Commentator" filed 620, "Management Approver" field 630, and "Escalation/Reviewer" filed 640 may be provided. Additional fields, such as "Executive Assistant/Support" (not shown) and other fields may be provided as is necessary and/or desired.

In one embodiment, the fields are used to automatically categorize the messages based on the role (e.g., owner, reviewer, management support). For example, a different tab may be provided for each role, action separation, specification, etc.

In one embodiment, messages may be linked or associated with workspaces and collaborative platforms. For example, messages may be dragged and dropped to collaborative platforms to become a discussion rather than a single message. In one embodiment, exchanges may occur on the collaborative platform. Alerts and notification of messages and actions may be sent to members of the project.

In one embodiment, nodes that include user pictures and/or user information may be provided to assist in addressing messages, meeting requests, etc. In one embodiment, information for the nodes may be provided from, for example, corporate directories, human resources directories, social media sites, etc.

In one embodiment, messages may be prioritized based on the geolocation of the sender, the geolocation relationship of the sender and the receiver, etc.

Figure 7:
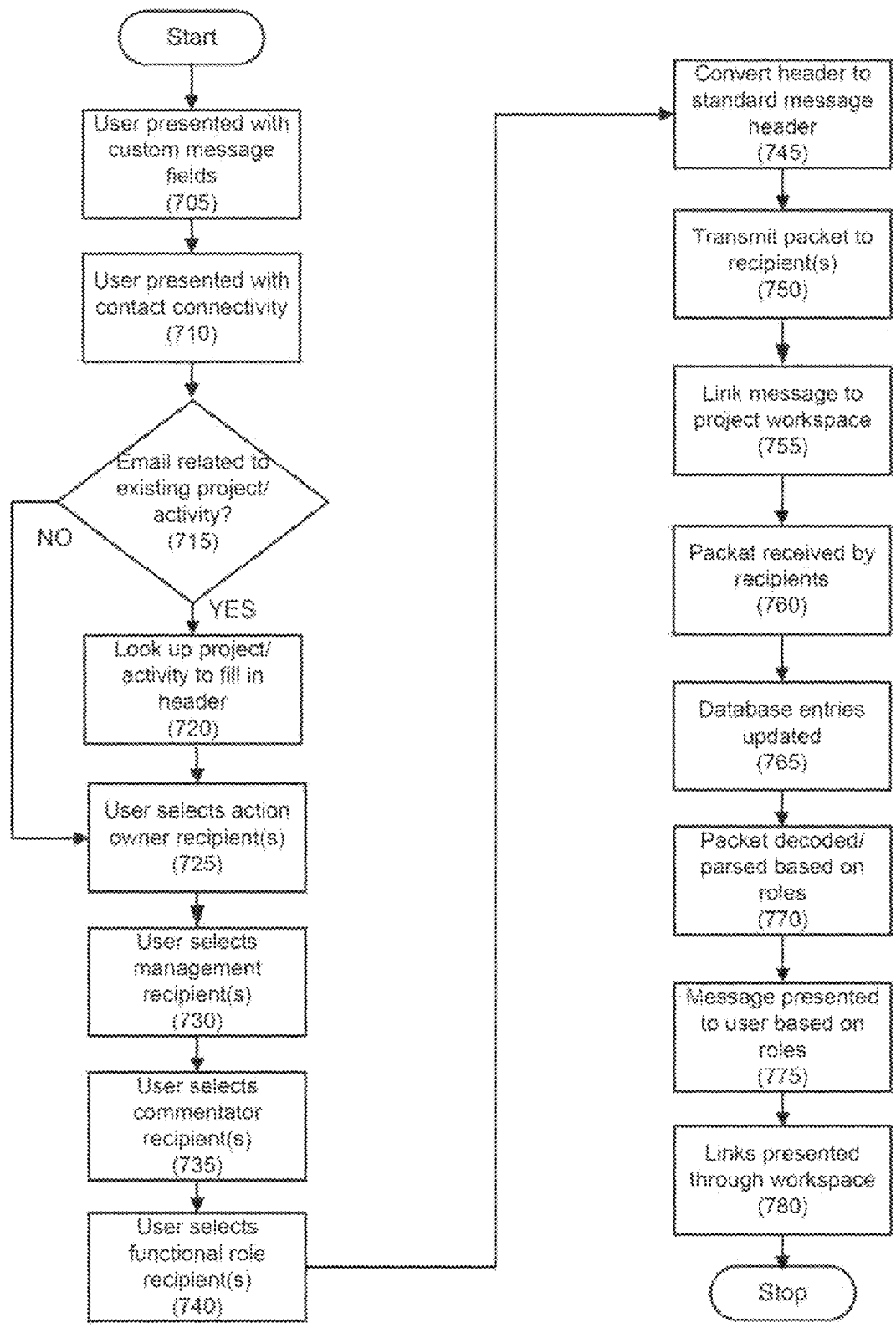
FIG. 7 is a flowchart depicting a method for categorization and prioritization of messages using an action menu according to one embodiment.

Referring to FIG. 7, a method for categorization and prioritization of messages using an action menu according to one embodiment is provided. In step 705, the user may be presented with the fields, such as those depicted in FIG. 6.

In step 710, the user may be presented with a graphical representation of user's contacts, an organizational chart, etc. In one embodiment, the graphical representation may include connectivity information, roles/responsibilities, shared contacts, pictures, etc.

In step 715, a check is made to see if the message that is being drafted corresponds to an existing project or activity. If it is, in step 720, the project or activity may be identified, and information from the project or activity may be used to pre-populate fields.

In step 725, the user may select one or more recipients for action owners. For example, the user may drag and drop, type, etc. recipients for the action owner field.

In step 730, the user may select one or more recipients for management approver/support. For example, the user may drag and drop, type, etc. recipients for the action owner field.

In step 735, the user may select one or more recipients for commentator/discussion participants. For example, the user may drag and drop, type, etc. recipients for the action owner field.

In step 740, the user may select one or more recipients for customized functional role participants. For example, the user may drag and drop, type, etc. recipients for the action owner field.

In step 745, the message header packet may be converted to a standard message format. A packet may be a "wrapped message"/"supermessage" where functional/role/action item data and other information may be incorporated. After being sent over standard messaging protocols, the packet may be converted back to the original packet form on the receiver end. In one embodiment, the different recipients may be converted to email addresses.

In step 750, the message may be transmitted to the recipient(s) identified in the header. In one embodiment, this may be based on the recipient(s) roles.

In step 755, the message may be linked to the a project workspace. In one embodiment, the message may be linked to any attachments filed in the corresponding workspace databases.

In step 760, the message may be received by the recipient(s) for the message.

In step 765, any corresponding back-end graph database entries may be updated.

In step 770, the message may be decoded/parsed according to the roles identified in the header.

In step 775, the message may be presented to the user based on the identified roles in the message header.

In step 780, the user may be presented with direct action links and buttons through a shared workspace. In one embodiment, the user may be presented with an integrated workspace, messages, attachments, action items, visualizations, etc.

Figure 8:
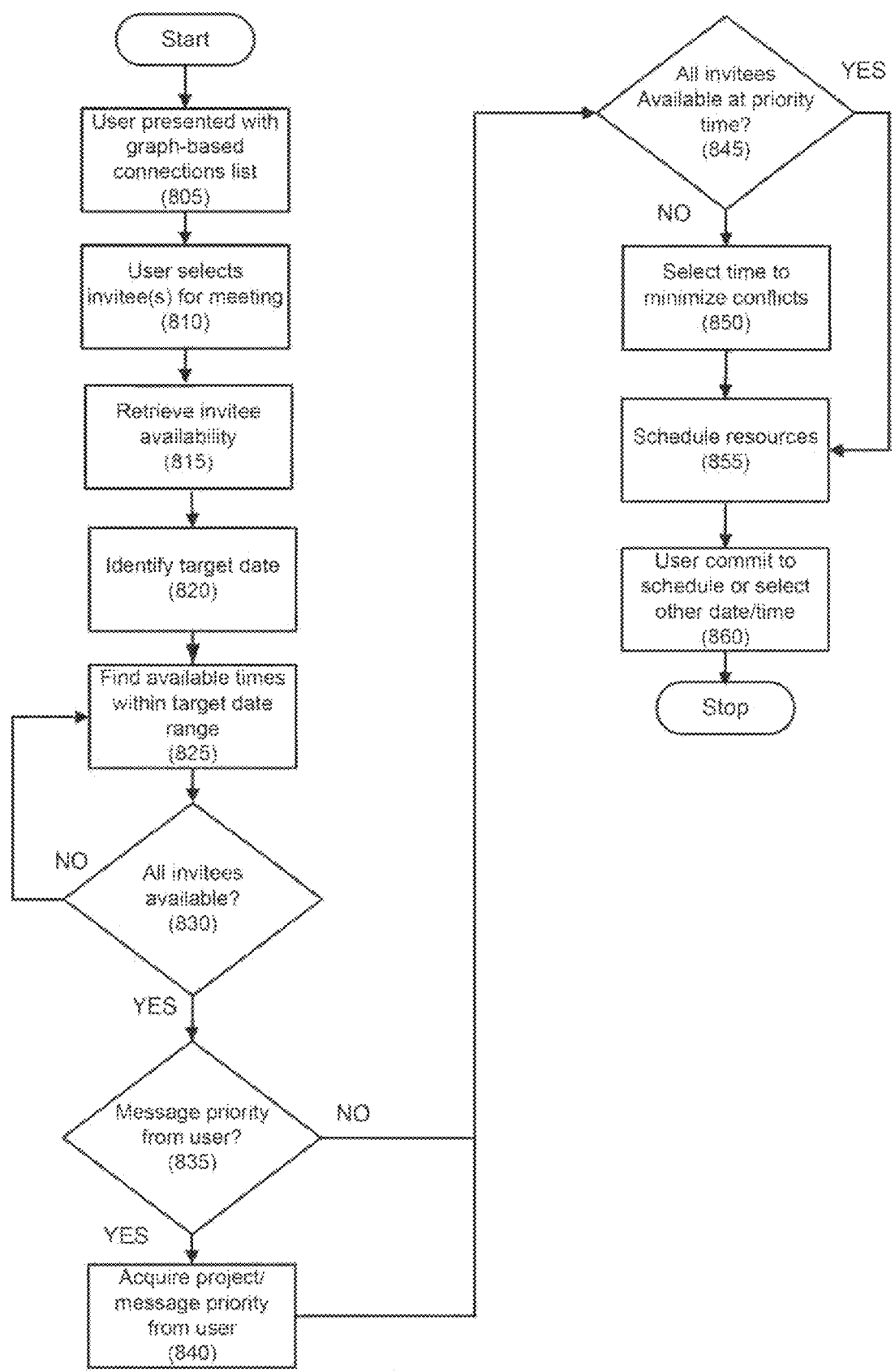
FIG. 8 is a flowchart depicting a method for automatic meeting scheduling according to one embodiment.

In one embodiment, meetings may be automatically scheduled based on messages that are received and/or are in the user's message repository. Referring to FIG. 8, a method for automatic meeting scheduling according to one embodiment is provided.

In step 805, a user may be presented with contacts for a meeting. In one embodiment, the contacts may be standard (e.g., name, email address, etc.) contact. In another embodiment, the user may be visually/graphically presented with his or her contacts, including pictures, connectivity information, etc. In one embodiment, a hierarchy of contact may be provided.

In step 810, the user may select an invitee (or invitees) for a meeting. In one embodiment, the user may drag and drop the invitees into a "schedule app" that may be provided on a region of the screen. In another embodiment, the user may right click on the contact and then, for example, select "schedule." Any other suitable method or technique may be used as necessary and/or desired.

In step 815, the schedule application may access the user's availability information using the user's calendar.

In step 820, the application may use text analytics to identify a target date for the meeting. In one embodiment, weak keyword analytics through natural language processing may be used.

In step 825, the application may identify available times at the target date/time range.

In step 830, the application may check to see if all invitees are available at the time. If they are not, the process returns to step 825.

In step 835, the application checks to see if there is a priority for the message and/or project, and, if so, in step 840, may acquire a project or message priority to be applied to the meeting invite.

In step 845, a second check may be made to see if all invitees are available based on priority and/or preference information.

In step 850, the application may select a date/time to minimize the number of conflicts among the invitees.

In step 855, the application may identify and schedule necessary resources as required. For example, the application may identify and schedule a conference room and amenities (e.g., lunch, snacks, beverages, etc.) if requested. In another embodiment, the application may schedule a teleconference, videoconference, WebEx, etc.

In step 860, the user may be asked to commit to the schedule or select from other dates, times, etc. In one embodiment, the user may be asked to confirm the meeting before invites are provided to the invitees. In another embodiment, the user may customize the request. For example, the user may add meeting materials, links, etc. as necessary and/or desired.

Figure 9:
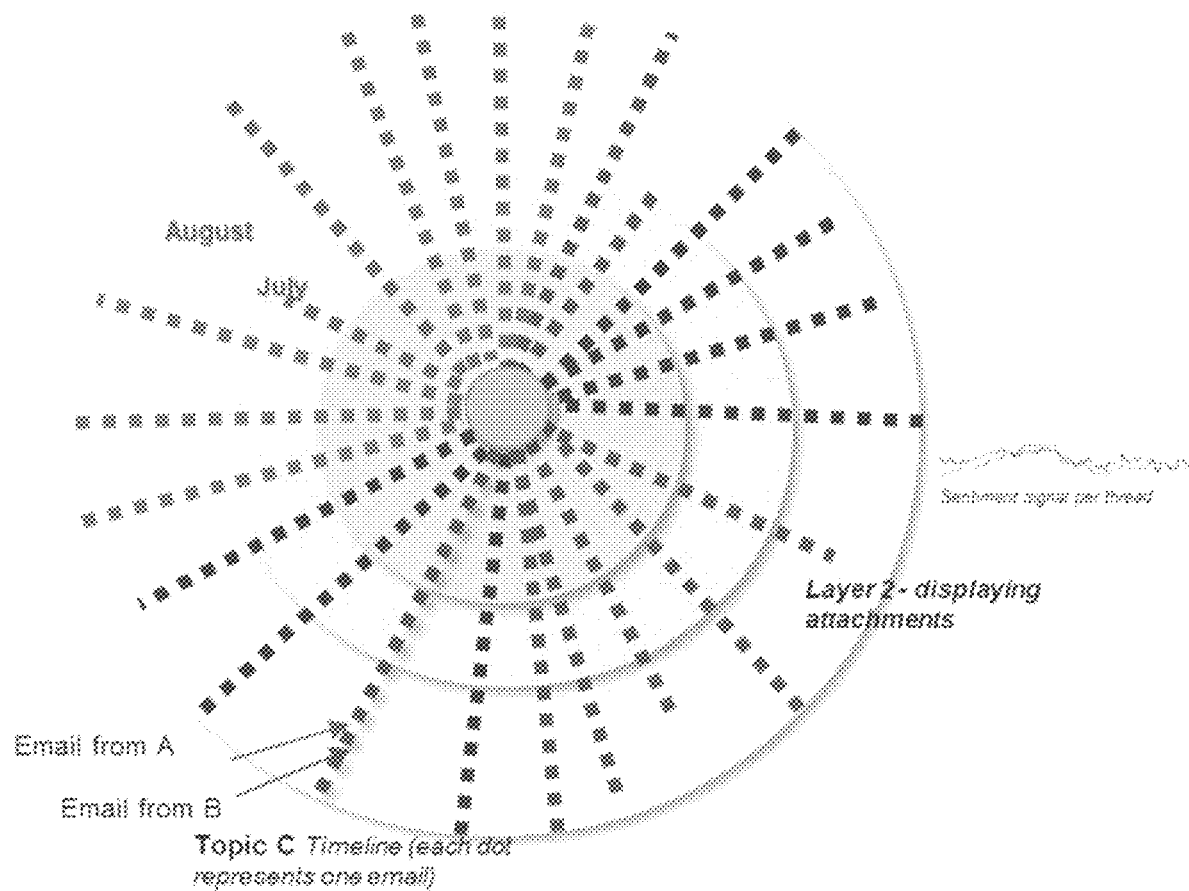
FIG. 9 depicts an example visualization technique according to one embodiment.

In one embodiment, rather than using a traditional inbox to display messages to a user, advanced visualization techniques may be used. Referring to FIG. 9, an example of such a technique is illustrated.

Figure 10:
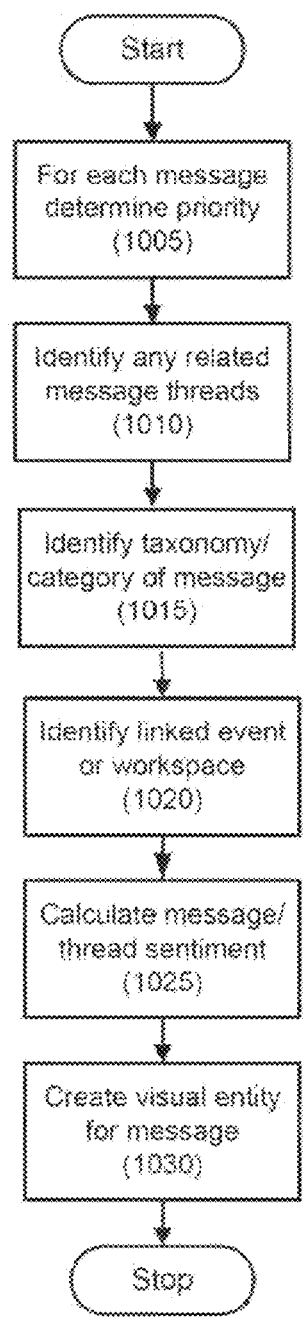
FIG. 10 is a flowchart depicting a method of using advanced visualization techniques for message processing according to one embodiment.

Referring to FIG. 10, a method of using advanced visualization techniques, such as that depicted in FIG. 9, for message processing according to one embodiment is disclosed. In step 1005, as a message is received, the priority may be determined. In one embodiment, the priority may be determined as discussed above.

In step 1010, if the message is related to an existing message thread, then the message may be linked to that thread.

In step 1015, the taxonomy/category for the message may be determined. In one embodiment, the message may be linked to the determined taxonomy/category.

In step 1020, it is determined if the message is associated with an event, workspace, etc. If it is, in one embodiment, the message may be linked to the event, workspace, etc.

In step 1025, the message and/or thread sentiment may be determined using text analytics. In one embodiment, this may be performed using the techniques discussed above.

In step 1030, a visual entity for the message in the graph database may be generated. In one embodiment, a graph database (or any other suitable database) may store the connectivity information among users, emails, projects, etc. In one embodiment, the message may be linked to other messages in a thread. The timing of the messages may be represented visually.

In step 1040, the message may be rendered. In one embodiment, the message may be rendered by sentiment, based on user interconnectivity, event connectivity, topic taxonomy, categorization, clustering, action items/role characteristics, priority, attachments and workspaces links, etc.

In step 1045, the message may be cross-linked and visually layered in one embodiment, multiple visual layers may be provided, with each layer illustrating different aspects of how the messages are linked.

In step 1050, the messages may be rendered using a different criteria. In one embodiment, one layer may illustrate the graph connectivity between the sender and receiver, another layer showing the connectivity of the email to a project. In another embodiment, one layer may illustrate the connectivity between two users through emails, etc. Any suitable rendering may be used as necessary and/or desired.

Figure 11:
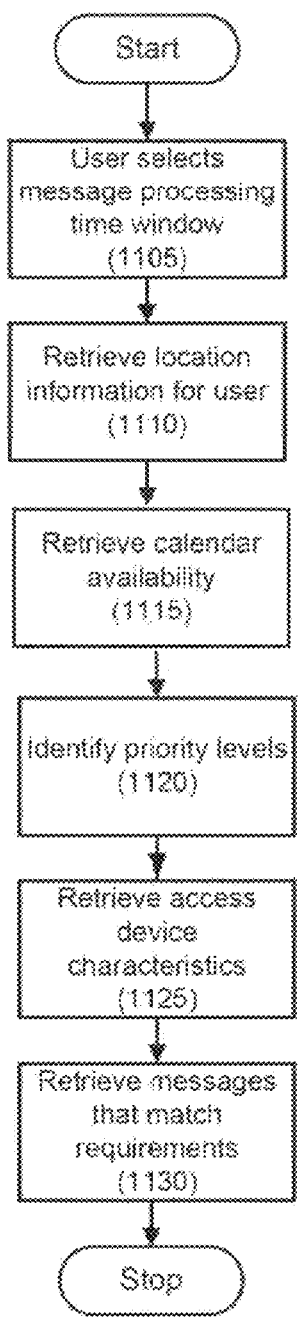
FIG. 11 is a flowchart depicting a method for message preprocessing and prioritization according to one embodiment.

Referring to FIG. 11, a method for message preprocessing and prioritization is provided according to one embodiment. In one embodiment, the method may be used to prioritize a large number of messages in a user's message repository (e.g., an email inbox). In one embodiment, the preprocessing and prioritization system may consider the number of unread messages in the user's message repository, the user's message throughput (e.g., the number of messages the user processes versus the number of incoming messages), the user's calendar and availability, the user's travel pattern, etc. In one embodiment, the degree and extent of the preprocessing and prioritization may be based on at least these factors. For example, if the user has a large number of messages in his or her inbox, generally receives more messages that are read in a day, has little availability, etc. the preprocessing and prioritization will be more aggressive.

In one embodiment, the message repository may automatically reject a message if the message is not associated with an action required flag or indicator, a management escalation review flag or indicator, etc. In another embodiment, the negotiations may be based on a user's preferences, firm-wide email policies, queue length and processing speed, email priorities, a user's other deadlines/calendar availability or travel status. The controller may negotiates with the sender whether to accept the email or to route it to someone else, etc.

In one embodiment, the preprocessing and prioritization system may also consider the device that the user is using to access his or her messages. For example, if the user is using a mobile device that may have document access and/or visualization/screen restrictions, only messages with matching content may be retrieved. In another embodiment, the system may consider the type of connection (e.g., 3G, 4G, WiFi) that is in use. For example, if the user is sent a message that he/she cannot access the corresponding file on his/her mobile device immediately (as the user is traveling), then priority may be adjusted accordingly.

In another embodiment, the location of the user may be used to prioritize messages. For example, if the user is travelling, the priority of messages from senders that are in the user's vicinity may have a higher priority than those that are not.

In another embodiment, the user's availability to review messages may be used to priority messages. For example, if the user has a certain amount of time available, a predetermined number of messages may be retrieved, and a predetermined number of messages with action requests may be retrieved. In one embodiment, the predetermined amount may be based on the historical number of messages that the user processes within the amount of time available, etc. Any suitable basis may be used as necessary and/or desired.

Referring to FIG. 11, in step 1105, the user may select a message processing time window. In one embodiment, the user may manually select this time. In another embodiment, the user may schedule this to occur periodically. In still another embodiment, the system may learn user preferences and perform this task based on the time of day, the user's schedules, the user's priority list, the user's priority senders, the number of messages in the message repository, etc.

In step 1110, the location information for the user may be retrieved. This may be done by for example, retrieving the GPS or cellular location for the user's mobile device, determining a location based on the user's schedule, etc.

In step 1115, the user's availability may be retrieved from the user's calendar or similar scheduling tool. For example, if the user has five minutes of availability, only top priority messages from management with an immediate action requested may be retrieved and/or presented to the user. If the user has thirty minutes available, top and medium priority messages, with or without action requests, may be retrieved and/or presented to the user.

In one embodiment, an estimated number of messages that the user can review during the user's availability may be determined. In one embodiment, this may be based on historical message review data for the user.

In step 1120, corresponding priority levels may be retrieved from a message repository.

In step 1125, the characteristics of the device that the user is using to access the messages may be retrieved. In one embodiment, the device information may include the manufacturer, model number, screen resolution, connectivity, etc.

In step 1130, messages that match the user's requirements may be retrieved. In one embodiment, the messages may be retrieved from a server into the user's message repository, or inbox.

Figure 12:
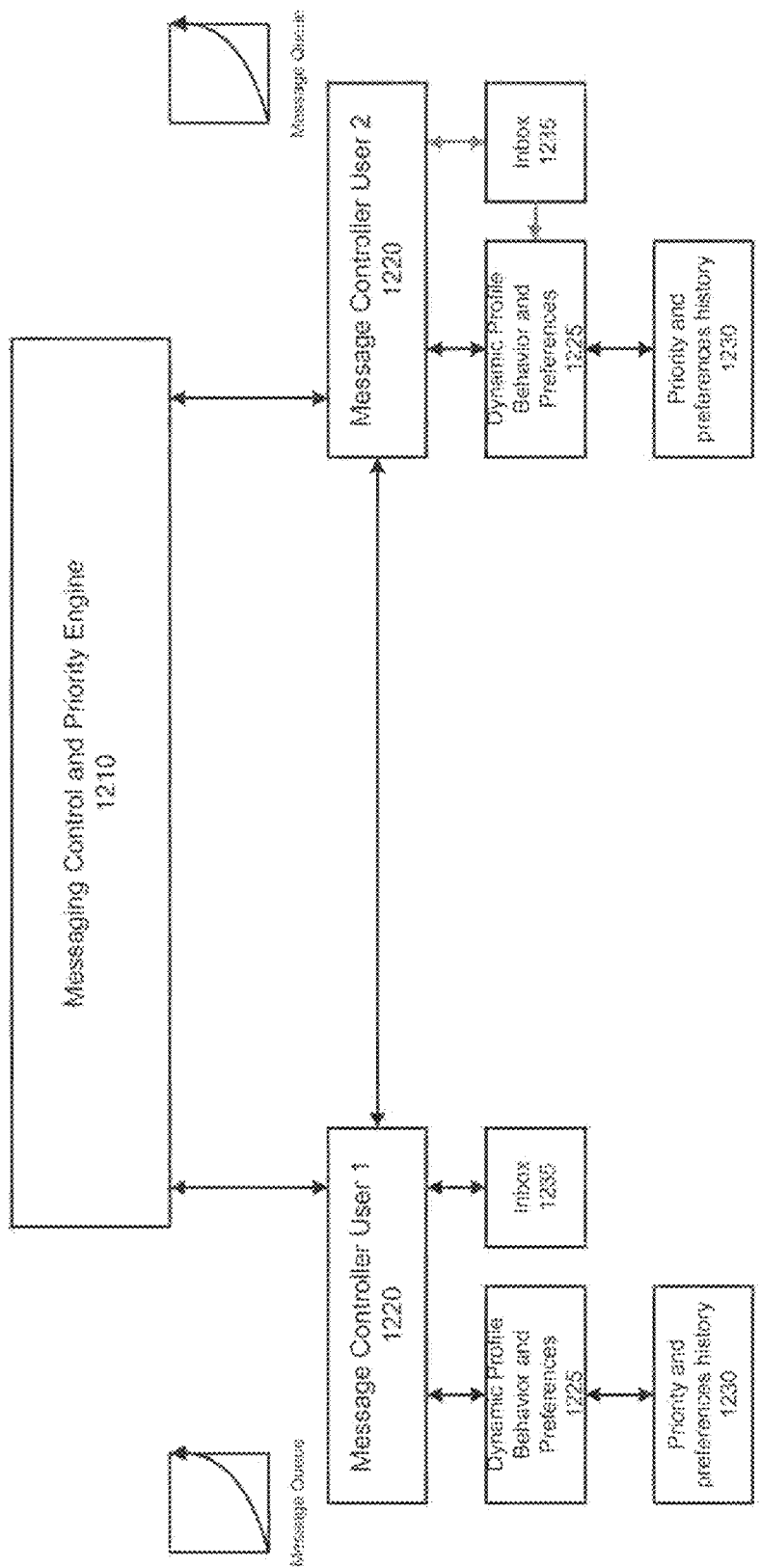
FIG. 12 is a block diagram depicting a system for message processing according to one embodiment.

Referring to FIG. 12, a system for message processing according to one embodiment is disclosed. An organization, enterprise, corporation, agency, group of users, etc. may be provided Message Control and Priority Engine 1210 that may receive external messages, store messages, prioritize messages as they are received or sent within the organization, control the manner in which messages are delivered to users, control registration, set organizational policies, etc. In one embodiment, Message Control and Priority Engine 1210 may enforce compliance with organization policies, restrictions, etc., governmental regulations, etc. For example, if an organization's policy prohibits party A from corresponding with party B on certain matters, Message Control and Priority Engine 1210 may prevent message from party A to party B from being delivered, Each user may be provided with message controller 1220, dynamic profile behavior and preferences module 1225, priority and preferences history 130, and message inbox 1235. In one embodiment, Dynamic Profile Behavior and Preferences module 1225

Figure 13:
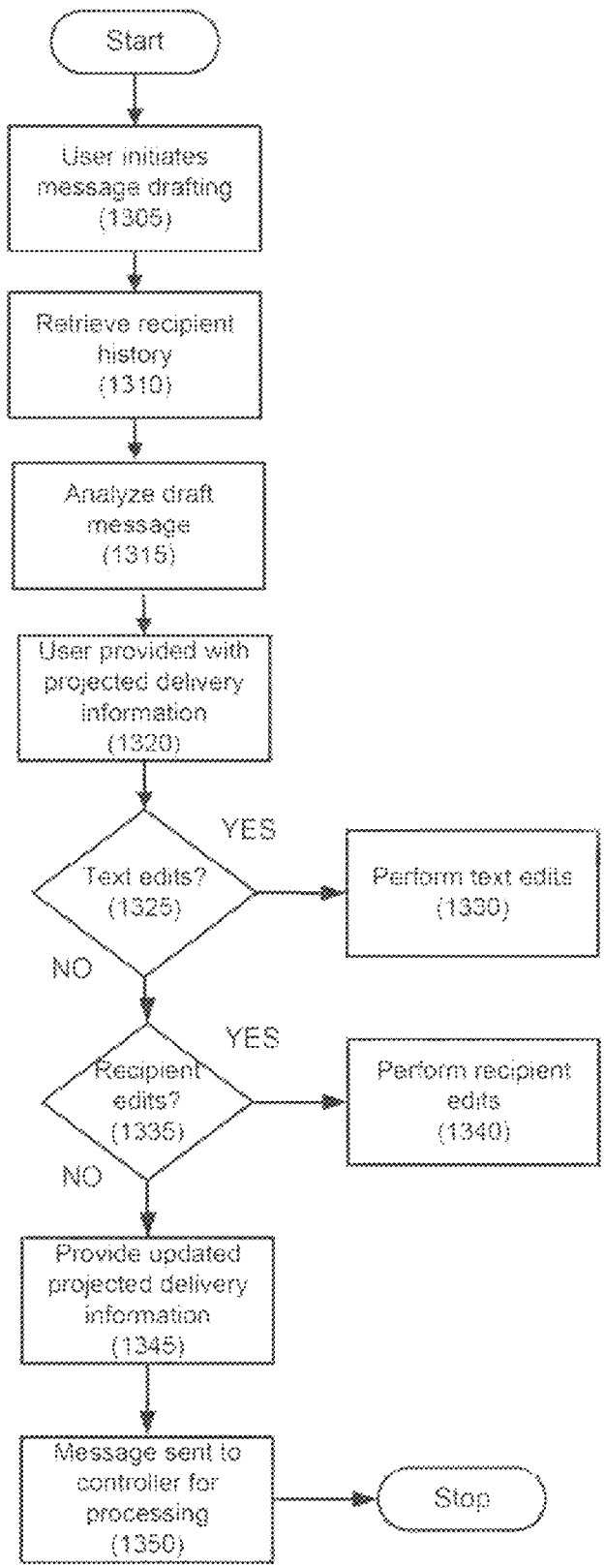
FIG. 13 is a flowchart depicting a method for processing messages according to one embodiment.

Referring to FIG. 13, a method for processing messages is disclosed. In step 1305, a user may initiate the drafting of a message. In one embodiment, the user may access a message editor, email client, etc.

In step 1310, once a recipient or recipients are identified, the system may retrieve recipient history information for each recipient. For example, in one embodiment, the system may retrieve data regarding the recipient's message queue, message priority, delivery history, etc. In one embodiment, this data may be retrieved from the recipient's message controller.

In step 1315, the system may analyze the draft message. In one embodiment, the system may apply the retrieved recipient data to the draft message to determine an estimated delivery success for the message, a predicted processing time, etc. for each recipient.

In step 1320, the system may provide this information to the user. In one embodiment, this information may be provided in real-time, close to real-time, or periodically during the message drafting process. The information may be provided in a separate window, in the message engine, etc. In one embodiment, keywords that increase and/or decrease the priority of the message may be indicated to the user by, for example, highlighting the keywords (e.g., high priority keywords in green, low priority keywords in red, greyed-out, etc.), identifying high and/or low priority keywords in a separate window, etc. Any suitable way of communicating the delivery information and/or keyword information may be used as necessary and/or desired.

In one embodiment, the system may offer suggestions to the user to increase the estimated delivery success and/or the predicted processing time. For example, if the system identifies a word (or word) that is causing the estimated delivery success to decrease, the system may highlight those words for the user.

As another example, if the recipient has a low estimated delivery success, the system may identify other recipients who may have a higher estimated delivery success. For example, the system may suggest an alternate recipient who may be on the same project and has a higher estimated delivery success.

In step 1325, if the user makes any text edits, in step 1330, the text edits may be made. In step 1335, if the user changed the recipient(s), in step 1340, the recipient edit(s) may be made.

In step 1345, the user may be provided with updated projected delivery information if any changes were made.

In step 1350, the message may be sent to the enterprise or group controller for priority assignment, history look up, etc. and potential delivery to the recipient.

Figure 14:
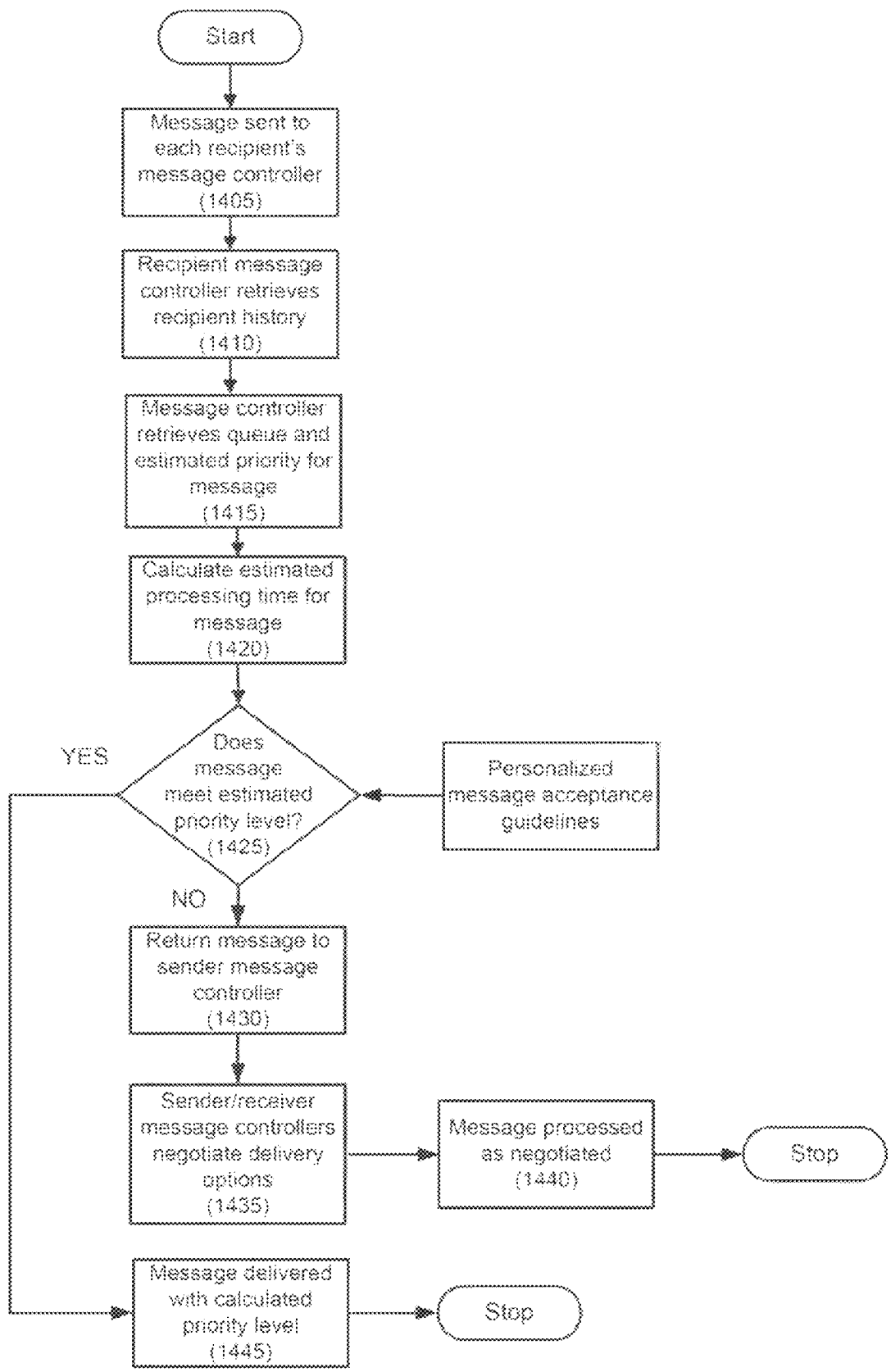
FIG. 14 is a flowchart depicting a method for processing messages according to another embodiment.

Referring now to FIG. 14, a method for processing incoming messages is disclosed.

In step 1405, a message is sent to each intended recipient(s) message controller.

In step 1410, the recipient's message controller retrieves the recipient's history, including any message priority data.

In step 1415, the recipient's message controller retrieves the message queue for the recipient, and estimates the priority for the incoming message.

In step 1420, the recipient's message controller may calculate an estimated processing time for the incoming message.

In step 1425, the recipient's message controller may retrieve the recipient's personalized message acceptance guidelines and may determine if the message meets the acceptance guidelines. In one embodiment, the user and/or organization may set user message acceptance guidelines, such as only messages above a certain priority level are retrieved when the user is travelling, only messages related to a certain project are retrieved, messages from a certain sender are displayed first, messages for a certain topic are diverted to a different user, etc. The user and/or organization may customize the message acceptance guidelines as necessary and/or desired. If the message does meet these guidelines, in step 1445, the message may be delivered to the recipient with the calculated priority level.

If the message does not meet the estimated priority level, in step 1430, a return message may be sent to the sender's message controller, and in step 1435, the sender and receiver message controllers may negotiate delivery options. In one embodiment, the negotiation may be based on, for example, a points system. In one embodiment, the sender and receiver message controllers may re-submit a message to the drafter for editing, divert the message to a different recipient, etc. The sender and receiver message controllers may negotiate for any suitable message delivery option as necessary and/or desired.

In step 1440, the message may be processed as negotiated by the sender and receiver message controllers.

The disclosures of the following are hereby incorporated, by reference, in their entireties: U.S. Pat. Nos. 8,028,896 and 7, 117,365; U.S. patent application Ser. Nos. 14/010,061; 13/908,618; 13/940,799; 13/492,126; 13/297,475; 11/337, 563, 12/534,167; 10/867,103; 12/715,520; 10/710,315; 10/710,328; 11/294,785; and U.S. Provisional Patent Application Ser. Nos. 61/861,690; 61/866,572; 61/861,690; 61/860,475; 61/820,917; 61/823,669; 61/844,097. The disclosure of each of these patent applications is hereby incorporated, by reference, in its entirety.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for prioritizing electronic messages in an electronic message repository, comprising:
    at least one computer processor receiving electronic location information from an mobile electronic device associated with the user;
    the at least one computer processor determining an amount of message review time available to a user to review electronic messages in the user's electronic mail repository based on the electronic location information;
    the at least one computer processor estimating a number of electronic messages that the user can review in the message review time based on a historical message review rate for the user automatically measured by the at least one computer processor;
    the at least one computer processor determining a priority level for each of a plurality of electronic messages in the user's electronic message repository;
    the at least one computer processor selecting one or more electronic messages for user review from a plurality of electronic messages in the user's electronic message repository based on the estimated number of electronic messages that the user can review and the priority level for the electronic messages,
    wherein the at least one computer processor continues to maintain the plurality of electronic messages in the user's electronic message repository; and
    the at least one computer processor provides the selected electronic messages to the user.

2. The method of claim 1, wherein the location is a current location.

3. The method of claim 1, wherein the location is a future location.

4. The method of claim 1, further comprising:
    the at least one computer processor retrieving the selected electronic messages from the electronic mail repository.

5. The method of claim 1, wherein the at least one computer processor pushes the selected electronic messages to the mobile electronic device associated with the user.

6. A method for prioritizing electronic messages in an electronic message repository, comprising:
    at least one computer processor receiving electronic calendar information for the user from an electronic calendar associated with the user;
    the at least one computer processor determining an amount of message review time available to a user to review electronic messages in the user's electronic mail repository based on the electronic calendar information;
    the at least one computer processor estimating a number of electronic messages that the user can review in the message review time based on a historical message review rate for the user automatically measured by the at least one computer processor;

the at least one computer processor determining a priority level for each of a plurality of electronic messages in the user's electronic message repository;

the at least one computer processor selecting one or more electronic messages for user review from a plurality of electronic messages in the user's electronic message repository based on the estimated number of electronic messages that the user can review and the priority level for the electronic messages, wherein the at least one computer processor continues to maintain the plurality of electronic messages in the user's electronic message repository; and the at least one computer processor provides the selected electronic messages to the user.

7. The method of claim 6, further comprising:

the at least one computer processor retrieving the selected electronic messages from the electronic mail repository.

8. The method of claim 6, wherein the at least one computer processor pushes the selected electronic messages to the mobile electronic device associated with the user.

9. A method for prioritizing electronic messages in an electronic message repository, comprising:

at least one computer processor retrieving a mobile electronic device characteristic from a mobile electronic device associated with the user, wherein the mobile electronic device characteristic indicates that the mobile electronic device has one of a document access or a visualization restriction;

the at least one computer processor determining an amount of message review time available to a user to review electronic messages in the user's electronic mail repository;

the at least one computer processor estimating a number of electronic messages that the user can review in the message review time based on a historical message review rate for the user using a mobile electronic device having the mobile electronic device characteristic automatically measured by the at least one computer processor;

the at least one computer processor determining a priority level for each of a plurality of electronic messages in the user's electronic message repository;

the at least one computer processor selecting one or more electronic messages for user review from a plurality of electronic messages in the user's electronic message repository based on the estimated number of electronic messages that the user can review and the priority level for the electronic messages wherein the at least one computer processor continues to maintain the plurality of electronic messages in the user's electronic message repository; and wherein the at least one computer processor provides the selected electronic messages to the user.

10. The method of claim 9, further comprising:

the at least one computer processor retrieving the selected electronic messages from the electronic mail repository.

11. The method of claim 9, wherein the at least one computer processor pushes the selected electronic messages to the mobile electronic device associated with the user.

* * * * *